US010169768B2

(12) United States Patent
Dione

(10) Patent No.: US 10,169,768 B2
(45) Date of Patent: Jan. 1, 2019

(54) SYSTEM AND METHOD FOR EXCHANGING INFORMATION BI-DIRECTIONALLY

(71) Applicant: Diegane Dione, Brooklyn, NY (US)

(72) Inventor: Diegane Dione, Brooklyn, NY (US)

( * ) Notice: Subject to any disclaimer, the term of this patent is extended or adjusted under 35 U.S.C. 154(b) by 283 days.

(21) Appl. No.: 15/252,834

(22) Filed: Aug. 31, 2016

(65) Prior Publication Data
US 2017/0053317 A1 Feb. 23, 2017

Related U.S. Application Data

(60) Division of application No. 13/626,353, filed on Sep. 25, 2012, now Pat. No. 9,916,591, which is a continuation of application No. 13/084,189, filed on Apr. 11, 2011, now Pat. No. 8,284,061.

(60) Provisional application No. 61/588,500, filed on Jan. 19, 2012.

(51) Int. Cl.
| | |
|---|---|
| *G06K 7/10* | (2006.01) |
| *G06Q 30/02* | (2012.01) |
| *G06K 19/07* | (2006.01) |
| *G06Q 20/20* | (2012.01) |
| *G06Q 20/32* | (2012.01) |

(52) U.S. Cl.
CPC ......... *G06Q 30/02* (2013.01); *G06K 7/10366* (2013.01); *G06K 19/0723* (2013.01); *G06Q 20/204* (2013.01); *G06Q 20/3278* (2013.01); *G06Q 30/0267* (2013.01); *G06Q 30/0269* (2013.01)

(58) Field of Classification Search
CPC ............... G06Q 30/02; G06Q 30/0269; G06Q 20/3278; G06Q 30/0267; G06Q 20/204; G06K 7/10366

USPC ........... 340/12.51, 572.1; 705/7.11, 17, 26.1, 705/27.2; 709/219–224; 235/376–383
See application file for complete search history.

(56) References Cited

U.S. PATENT DOCUMENTS

| | | | |
|---|---|---|---|
| 6,741,856 B2 | 5/2004 | McKenna et al. | |
| 6,938,021 B2 * | 8/2005 | Shear ................. | G06Q 20/3674 705/67 |
| 7,065,499 B1 * | 6/2006 | Seth ....................... | G06Q 10/08 705/26.5 |
| 7,118,037 B2 | 10/2006 | Holloway et al. | |
| 7,317,394 B2 | 1/2008 | Koh et al. | |

(Continued)

FOREIGN PATENT DOCUMENTS

WO 2000070585 A1 11/2000

OTHER PUBLICATIONS

PCT Written Opinion of the International Searching Authority, dated Jan. 25, 2013, 8 pages.

(Continued)

*Primary Examiner* — Andrew Joseph Rudy
(74) *Attorney, Agent, or Firm* — Barley Snyder

(57) ABSTRACT

A communications system and method by which information is transmitted and received bi-directionally between digital signage and individuals viewing scenes displayed on digital signage. The digital signage transmits and receives information via an RFID reader and the individual transmits and receives information via an RFID tag. The system and method are useful in providing subscribers to a product/service information database with individually customized information about products and services based on the personal profiles of the individual subscribers.

6 Claims, 6 Drawing Sheets

(56) References Cited

U.S. PATENT DOCUMENTS

| | | | |
|---|---|---|---|
| 7,474,211 B2 | 1/2009 | Kramer | |
| 7,496,519 B2 * | 2/2009 | Hahn-Carlson | G06Q 10/083 705/317 |
| 7,649,460 B2 | 1/2010 | Rodgers | |
| 7,689,247 B2 * | 3/2010 | Dawood | H04W 28/18 370/229 |
| 7,847,694 B2 | 12/2010 | Lee et al. | |
| 7,962,361 B2 * | 6/2011 | Ramchandani | G06Q 30/02 705/14.23 |
| 7,994,919 B2 | 8/2011 | Vrba et al. | |
| 8,009,105 B2 | 8/2011 | Wang et al. | |
| 8,109,378 B2 | 2/2012 | Boydston et al. | |
| 8,135,621 B2 * | 3/2012 | Vishik | G06Q 20/10 705/1.1 |
| 8,138,922 B2 | 3/2012 | Lindsay et al. | |
| 8,170,783 B2 | 5/2012 | O'Connor et al. | |
| 8,281,027 B2 | 10/2012 | Martinez et al. | |
| 8,284,061 B1 * | 10/2012 | Dione | G06Q 30/0269 235/383 |
| 8,299,928 B2 | 10/2012 | Kennedy | |
| 8,504,445 B2 | 8/2013 | Kusada et al. | |
| 8,611,867 B2 * | 12/2013 | Swanburg | G06Q 20/3223 455/405 |
| 8,669,845 B1 * | 3/2014 | Chakraborty | G06Q 50/00 235/440 |
| 8,725,567 B2 * | 5/2014 | Huang | G06Q 30/02 705/14.49 |
| 8,775,260 B1 * | 7/2014 | Pienkos | G06Q 10/087 705/22 |
| 8,849,705 B2 * | 9/2014 | Khan | G06Q 20/12 705/26.1 |
| 9,049,545 B2 | 6/2015 | Duggal et al. | |
| 9,430,786 B2 * | 8/2016 | Khan | G06Q 30/06 |
| 9,584,335 B1 * | 2/2017 | Malasani | H04L 12/2816 |
| 9,659,320 B2 * | 5/2017 | Martucci | G06Q 10/087 |
| 9,760,943 B2 * | 9/2017 | Khan | G06Q 30/06 |
| 9,916,591 B2 * | 3/2018 | Dione | G06Q 30/02 |
| 10,013,705 B2 * | 7/2018 | Mikurak | G06Q 10/087 |
| 2003/0122708 A1 | 7/2003 | Percy et al. | |
| 2006/0161878 A1 | 7/2006 | Koh et al. | |
| 2007/0185776 A1 | 8/2007 | Nguyen et al. | |
| 2008/0004041 A1 | 1/2008 | Ahn et al. | |
| 2010/0077017 A1 | 3/2010 | Martinez et al. | |
| 2011/0106635 A1 | 5/2011 | Khan et al. | |
| 2011/0271301 A1 | 11/2011 | Kennedy | |

OTHER PUBLICATIONS

PCT Notification of Transmittal of the International Search Report and The Written Opinion of the International Searching Authority, or the Declaration, dated Jan. 25, 2013, 2 pages.

PCT Notification Concerning Transmittal of Copy of International Preliminary Report on Patentability, International Application No. PCT/US2012/059197, dated Jul. 31, 2014, 1 page.

PCT International Preliminary Report on Patentability, Application No. PCT/US2012/059197, dated Jul. 22, 2014, 7 pages.

\* cited by examiner

FIG. 2

| Printed Circuit Board List of Components | | | Diane Systems Inc. Proprietary & Confidential | | |
|---|---|---|---|---|---|
| Component Type | Component Description | Vendor | Model # or Serial # | Quantity | Dimensions |
| Balun | SMD balun / filter, 2.4 GHz | DigiKey | Manufacturer Part Number 2450BL14B050T Digi-Key Part Number 712-1034-1-ND | 1 | |
| CX1, CX2 | Crystal load capacitor 12 pF | DigiKey | Digi-Key Part Number: 478-1164-2-ND Manufacturer Part Number: 06035A120JAT2A/AV0 | 2 | L=1.6mm, W=0.81mm, Th=0.35mm |
| CB1, CB2, CB3, CB4 | LDO VREG bypass capacitor(CB1, Cb3), Power supply bypass capacitor(CB2, CB4), 1 µF | Mouser | Mouser Part #: 581-0603YD105K Manufacturer Part # 0603YD105KAT2A | 4 | L=1.6mm, W=0.81mm, Th=0.35mm |
| C1, C2 | RF coupling capacitor, 22 pF | DigiKey | Digi-Key Part Number 478-1167-2-ND Manufacturer Part Number: 06035A220JAT2A/AV0 | 2 | L=1.6mm, W=0.81mm, Th=0.35mm |
| C4 (optional) | RF matching, 0.47 pF | Mouser | Mouser Part #: 81-GRM215C1HR47C001D Manufacturer Part # GRM2165C1HR47C001D Manufacturer: Murata | 1 | W= 1.25 mm, L =2 mm Th= 0.6 mm |
| R1 | CLKM low-pass filter resistor 680 ohms | digiKey | Digi-Key Part Number P680ABCT-ND Manufacturer Part Number: ERJ-1GEF6800C (Panasonic) | 1 | L=1.6mm, W=0.81mm, Th=0.35mm |
| XTAL | 16 MHz crystal Oscillator | | Seward's Part Number: SX-4025 | 1 | L = 4.0mm, B = 2.5mm, h = 0.6 |
| XTAL | 32 KHz crystal | DigiKey | Digi-Key Part Number: 300-8728-1-ND Manufacturer Part Number CM315-32.768KDZF-UT | 1 | |
| CX3, CX4 | Capacitors, 7.0pF | DigiKey | Digi-Key Part Number 445-5041-1-ND Manufacturer Part Number C1608C0G1H070D | 2 | SM0603 |
| EEPROM | Atmel 24C1024 | | | | SAP |
| R1, R2 | Resistors, 5.1K | DigiKey | Digi-Key Part Number P5.1KGCT-ND Manufacturer Part Number ERJ-3GEYJ512V | 2 | SM0603 |
| Antenna | 50ohm impedance | | Digi-Key Part Number ANT-2.45-CHPCT-ND Manufacturer Part Number ANT-2.45-CHP-T | 1 | 1mm 6.5mm 2.2mm |
| Atmel Chip | 2.4GHz, 6LoWPAN | Atmel | ATmega128RFA1 | 1 | |
| The components below are part of the assembly but not connected and functionally independent from the RFID Tag above | | | | | |
| Self-Adhesive Magnetic Strip | 0.50 inch X 3.346 inch | | affixed on the back of the card | 1 | |
| Smart Card Integrated Circuit Chip | Contactless Interface | infineon | SLE 66CLX1280PE (M/S) Dual-interface and contactless security cryptocontroller | integrated circuit chip (ICC) | 1 |

SYSTEM AND METHOD FOR EXCHANGING INFORMATION BI-DIRECTIONALLY

CROSS REFERENCE TO RELATED APPLICATION

This application is divisional application which claims priority to U.S. application Ser. No. 13/626,353, filed Sep. 25, 2012, which claims the priority of Provisional Application 61/588,500 filed Jan. 19, 2012 and U.S. application Ser. No. 13/084,189 filed Apr. 11, 2011.

FIELD OF THE INVENTION

The present invention relates, in general, to a communications system and method for transmitting and receiving information bi-directionally and, in particular, to a communications system and method by which information is transmitted and received bi-directionally between digital signage and individuals viewing scenes displayed on digital signage.

BACKGROUND OF THE INVENTION

At the present time, "digital signage" is in common use for the marketing of products and services and the use of digital signage is increasing at a rapid pace. Such marketing is carried out in public areas, such as malls, office buildings, and airport, railroad, and bus terminals. As an individual, carrying a radio frequency identification (RFID) tag that both transmits and receives, comes within the range of digital signage, his or her presence is sensed by the digital signage and he or she is alerted by a transmission from the digital signage that is received by the RFID tag as to viewing a display that might be of interest. The individual can simply ignore the alert or decide to participate in an interactive exchange with the digital signage.

The digital signage systems in current use suffer from one or more shortcomings. Included in such shortcoming are inadequate protection of privacy, lack of handling more than one viewer at a time, and limitations on the utility of results, such as the individual is left determine which way to proceed from a number of different options.

SUMMARY OF THE INVENTION

In accordance with the present invention, a communications system for bi-directionally exchanging information relating to the marketing of products and services includes an RFID tag that is in the possession of a selected subscriber of a group of subscribers to products/services information relating to the marketing of products and services that are of potential interest to the subscribers. The RFID tag includes means for storing coded identity information uniquely associated with the selected subscriber and means for transmitting to an RFID reader a presence signal that includes the coded identity information that is uniquely associated with the selected subscriber and indicates his/her presence in a physical area within the signal receiving range of the RFID reader. The RFID tag also transmits to the RFID reader an interest signal that indicates at least one of (1) no interest in product/service information specifically selected by the RFID reader for the selected subscriber, and (2) interest in product/service information specifically selected by the RFID reader for the selected subscriber. The RFID tag includes means for receiving an inquiry signal from the RFID reader relating to potential interest in the selected product/services information and information from the RFID reader relating to the purchase of the product/service included in the selected product/service information. The present invention also includes an RFID reader that includes means for storing product/service information relating to the marketing of products and services that are of potential interest to the group of subscribers and coded information relating to the identities of subscribers to the stored products/services information and personal profiles of individual subscribers to the stored products/services information that indicate which products and services are of potential interest to individual subscribers. The RFID reader also includes means for receiving the presence signal from the RFID tag and the interest signal from the RFID tag. The RFID reader further includes means for confirming the status of the selected subscriber as being a subscriber to the product/service information by comparing the coded identity information uniquely associated with the selected subscriber in the presence signal with the stored coded information relating to the identity of the selected subscriber. The RFID reader also includes means for selecting from the stored product/service information the product/service information of potential interest to the selected subscriber based on the stored profile information of the selected subscriber and means for analyzing the interest signal to determine at least one of (1) ending communications between the RFID reader and the RFID tag when the interest signal indicates no interest in the selected product/service information and (2) continuing communications between the RFID reader and the RFID tag when the interest signal indicates interest in the selected product/service information. The RFID reader further includes means for transmitting an inquiry signal relating to the selected product/service information and information relating to the purchase of the product/service included in the selected product/service information.

In accordance with the present invention, a method for bi-directionally exchanging information relating to the of products and services includes the step of storing product/service information relating to the of products and services that are of potential interest to a group of subscribers to the product/service information and coded information relating to the identities of subscribers to the stored product/service information and personal profiles of individual subscribers to the stored product/service information that indicate which products and services are of potential interest to individual subscribers. The present invention also includes the step of transmitting a presence signal from an RFID tag in the possession of a selected subscriber that includes coded identity information uniquely associated with the selected subscriber indicating his/her presence in a physical area within the signal receiving range of a digital signage RFID reader and the step of receiving the presence signal by the RFID reader. The present invention further includes the step of confirming the status of the selected subscriber as being a subscriber to the product/service information by comparing the coded identity information uniquely associated with the selected subscriber in the presence signal with the stored coded information relating to the identity of the selected subscriber. The present invention also includes the step of retrieving stored personal profile information of the selected subscriber and the stored product/service information and the step of selecting from the stored product/service information the product/service information of potential interest to the selected subscriber based on the stored profile information of the selected subscriber. The present invention further includes the step of displaying on a screen of the digital signage for viewing by the selected subscriber the selected product/service information, the step of transmitting an inquiry signal from the RFID reader relating to the selected product/service information, and the step of receiving by the RFID tag in the possession of the selected subscriber the inquiry signal. The present invention also includes the step of transmitting by the selected subscriber an interest signal indicating at least one of no interest in the selected product/service information and interest in the selected product/service information, the step of receiving by the RFID reader the interest signal, and the step of analyzing the interest signal and determining at least one of (1) ending communications between the RFID reader and the RFID tag when the interest signal indicates no interest in the selected product/service information, and (2) continuing communications between the RFID reader and the RFID tag when the interest signal indicates interest in the selected product/service information.

BRIEF DESCRIPTION OF THE DRAWINGS

FIG. 2 is a table of Bill of Materials that can be used in implementing the present invention.

GENERAL DESCRIPTION OF THE INVENTION

Overview of the Present Invention

Figure 1:
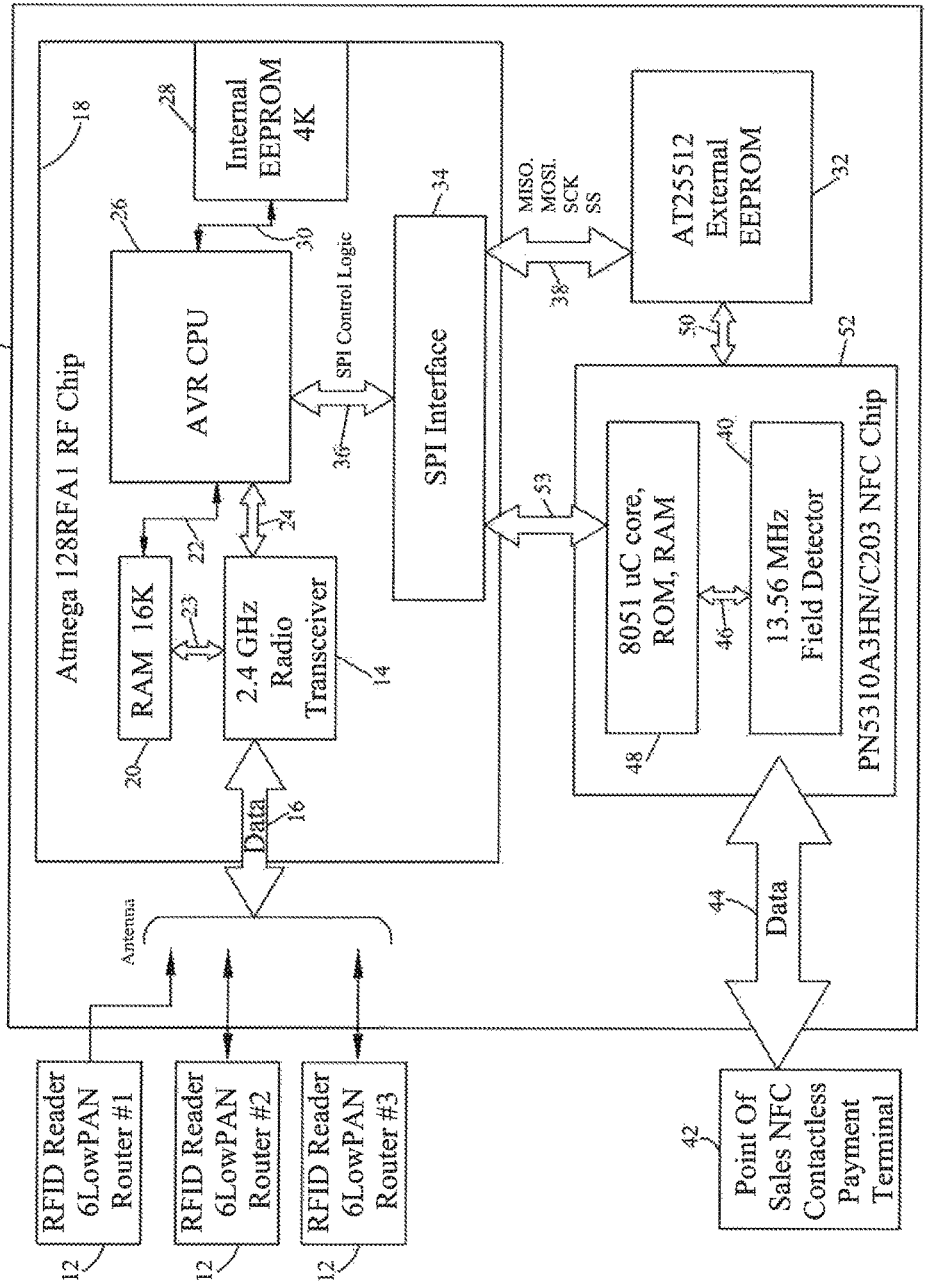
FIG. 1 is a block diagram of a preferred embodiment of the present invention.

This invention is about the ability of digital signage, functioning as an RFID reader, to exchange information bi-directionally, with an RFID tag. A digital signage device is able to transmit data, information, and content that will be evaluated using an automated algorithm and to determine if it should or should not be stored in an RFID tag. An RFID tag is able to exchange information sequentially or in parallel with many digital signage units functioning as RFID readers.

This invention also provides the ability for a person carrying an RFID tag to control the information/content displayed and featured by a digital signage unit without requiring the person to use a remote control device, motion sensor device, computer mouse, joystick, or the like, or to touch the screen. The RFID tag can be located anywhere on the person's body or inside an item that the person is carrying or holding.

The following are preferred ways of implementing and constructing the present invention.
  RFID tag with a form factor of a card that is compliant with the ISO/IEC 7810 standard. RFID tags with other form factors can also be used.
  ZigBee (802.14.5) as the wireless protocol for exchanging information. Other wireless protocols can also be used.
  Active RFID tags. However passive, semi-passive, or battery-assisted passive tags can also be used.

Definitions and Glossary of Terms Used Throughout the Present Application

"Radio-frequency identification" or "RFID" is the use of an object (typically referred to as an RFID tag) applied to or incorporated into a product, animal, or person for the purpose of identification and tracking using radio frequency waves. Some tags can be read from several meters away and beyond the line of sight of the reader. Most RFID tags contain at least two parts. One is an integrated circuit for storing and processing information, modulating and demodulating a radio-frequency (RF) signal, and other specialized functions. The second is an antenna for receiving and transmitting signals. There are generally three types of RFID tags: (1) active RFID tags, which contain a battery and can transmit signals autonomously; (2) passive RFID tags, which have no battery and require an external source to provoke signal transmission; and (3) battery assisted passive (BAP) which require an external source to wake up but have significant higher forward link capability providing great read range.

"Digital signage" is interchangeable with "digital billboard" or "large electronic display/screen/sign for stadium, concert, show, sport" or "television" or "high definition television" or "computer monitor" or "Microsoft Surface Technology" or "personal computer" or "server" or "computer" or "Apple" or "Macintosh" and the like. "Digital signage" and its associated readers(s), database, remote database, and other components are also referred to as one single "system" throughout this application. "Digital signage" is interchangeable with "digital signage is equipped with RFID reader(s)" and with "digital Signage which is able to function as an RFID reader".

"Digital signage equipped with RFID Reader(s)" means a digital signage which is able to function as an RFID reader. The RFID reader can be an internal RFID reader or an RFID reader attached to the digital signage via a slot (e.g., USB slot, MicroUSB slot, and the like) or via a port (e.g., serial port, network port, connection port, and the like) and other similarly available connection points. Multiple RFID readers can be internal components of or externally connected to the digital signage. The RFID readers can be placed at specific geometric points on or inside the digital signage.

"Digital signage equipped with RFID reader(s)" can have its own local/internal database or can be connected to a remotely located database. Digital signage is able to retrieve from and store information in its own local/internal database or retrieve from or store information in a remotely located database. The database is used by the digital signage to store and manage information and run an automated algorithm also referred as "Content Targeting, Personalization & Management (CTPM)"

"RFID reader" is interchangeable with "RFID detector" or "RFID router" or "network router" or "router". For the purpose of this invention, an "RFID reader" can be an integral part of a digital signage or external but connected to a digital signage or a standalone reader connected to another type of system.

The type of RFID tag discussed in this application has one, or some, or all of the following characteristics and requirements:
  The form factor of a card that can be compliant with the ISO/IEC 7810 standard. This is an international standard that defines the physical characteristics for identity or identification cards. The standard defines four card sizes: ID-1, ID-2, ID-3 and ID-000.
  The RFID tag can be embedded in, or attached to, or affixed to or integrated with any of the following types of cards: driver's license, credit card, debit card, charge card, retail card, payment card, points card, Social Security card, insurance card, healthcare card, medical card, employee ID card, student ID card, venue access card, event access card, building access card, event ticket, transportation card, subway card, frequent flyer card, private label card, passport, royalty card, business card, state ID card, welfare card, military card, phone company calling card, hotel room card (i.e., key), casino card, immigration card, and any government issued ID the like.

The aforementioned types of cards are typically used to identify a person, or belong to a person, or are carried by a person. Also included are other form factors, which are typically used to identify a person or uniquely belongs to a person, such as key fobs, car keys, door keys, bracelets, necklaces, watches, jewelry, lapel pins, casino chips, animal collars, etc. with an embedded RFID tag.

The RFID tag can be read by an RFID reader from a short distance but also from a long distance (measured in feet, yards, meters, or other larger unit of measures).

The information that the RFID tag contains can be downloaded, deleted, modified, updated, or appended by an RFID reader from a short distance but also from a long distance (measured in feet, yards, meters, or other larger unit of measures).

The information that the RFID tag contains can be downloaded, deleted, modified, updated, or appended by a digital signage equipped with an RFID reader from a short distance but also from a long distance (measured in feet, yards, meters, or other larger unit of measures).

The wireless protocol for exchanging information between an RFID tag and an RFID reader can be any of the following wireless protocols/wireless standards:

ZigBee (802.15.4)
Wi-Fi (802.11 family of protocols)
Bluetooth (802.15.1)
6LoWPAN (IPv6 over Low power Wireless Personal Area Networks Proprietary Protocol
GSM
GPRS
CDMA
HSPDA
WiMAX The RFID tag can have a picture of the individual owner.

The RFID tag can have a barcode.

The RFID tag can have an integrated circuit chip also known as a Smart Card chip.

The RFID tag can have a magnetic stripe.

The RFID tag can be embedded inside or attached to a mobile device, mobile phone, or personal digital assistant.

DETAILED DESCRIPTION OF THE INVENTION

People carry, on a daily basis, one type or multiple types of cards like the ones identified above in the "Definitions and Glossary" portion of this application. Also, on a daily basis, people walk by and stop to watch digital signage which are located inside buildings and outdoors. These digital signage display various content and information such as advertising, entertainment, news, emergency information, and other types of information.

The present invention includes digital signage that is able to function as an RFID reader that is able to communicate and exchange information with an RFID tag embedded in, or attached to, or affixed to or integrated within a credit card, payment card, debit card, charge card, or other types of cards such as the ones identified above in the "Definitions and Glossary" portion of this application. Purchases can be made with certain of these cards.

Organizations that pay to show content on these digital signage or own these digital signage do not currently have a way to directly send and store content from the digital signage onto the cards carried by the people who are walking by or stopping to watch. Multiple digital signage can be located within the same building or geographical area. Other places where the digital signage can be located are in public transportation systems, such as subway cars, train cars, boats, planes, buses, and ferries.

People can walk by multiple digital signage which are located a few feet apart, right next to each other, or across from each other. The present invention provides the capability for:

Multiple digital signage to simultaneously read the same RFID tag that is part of a card or of another type of object.

Multiple digital signage to exchange information with the same RFID tag that is part of a card or of another type of object.

An RFID tag that is part of a card or of another type of object to:
  Store content/information received from a digital signage.
  Store content/information received from multiple digital signage based on an automated algorithm.
  Store targeted and personalized content/information, for the card owner, received from a digital signage or multiple digital signage functioning as (an) RFID reader(s).
  Store different types of content/information in a sequential or parallel manner.

A first digital signage displays targeted and personalized information/content when the RFID tag of a card is within its read range/distance. When the person carrying the card is moving closer to a second digital signage, the rest of the content/information will continue to be displayed on that second digital signage. The first digital signage is able to stop displaying the information/content when the RFID tag of the same card is out its read range/distance.

A first digital signage is capable of displaying a message asking the person carrying a card with an RFID tag "Please stop walking and stand in front of this digital signage, if you would like to watch targeted and personalized information/content."

If the digital signage detects no further movement of the card, it is capable to start displaying the content.

The RFID tag is able to also transmit to the digital signage that it is no longer moving, which will instruct the digital signage to start displaying the content or information.

A digital signage, capable of functioning as an RFID reader, is capable of detecting the presence of an RFID tag within its read distance. The digital signage uses the unique identifier and/or additional data received from the RFID tag to retrieve additional and more detailed information about the card owner from its own database or from a remotely located database.

The RFID tag also transmits data to the digital signage that indicates whether the card is moving (i.e., the person carrying the card is moving) or the card is not moving (i.e., the person carrying the card is still). The digital signage, functioning as an RFID reader, is also capable of determining whether a card is moving or not.

Based on predefined or dynamically defined business rules, criteria, and/or conditions, the digital signage transmits information which will be received, prioritized, and stored or not be stored by the RFID tag of a card.

If an RFID tag of a card does not store the information/content received, then it will transmit a failure message or rejection message to the digital signage and an associated reason code. The digital signage is able to evaluate the reason code to determine whether or not to resend the same content/information or send a different content/information.

If an RFID tag stores the information/content received, then it will transmit an acknowledgement, confirmation message to the digital signage and an associated code. The digital signage is able to subsequently stop transmitting the content/information to the RFID tag and transmit new content/information.

The RFID tag of a card is programmed with specific instructions, codes, variables, and/or data parameters that will enable it to evaluate the content/information received before storing it or not storing it.

The codes, instructions, variables, and/or data parameters stored in the memory of the RFID tag are used as input to the content targeting personalization and management (CTPM) algorithm program running on the RFID tag and digital signage. This algorithm program is executed by a microcontroller or IC and other electronic components of the RFID tag circuitry.

Each code, variable, or data parameter has a specific meaning. The digital signage, functioning as an RFID reader, will include in the information/content that it is sending a series of associated codes and/or data parameters. The RFID tag will compare those codes and/or parameters received with the codes and parameters stored in its memory.

A code, variable, or a data parameter can signify a:
priority level
level of importance
sequence of information
ranking
unique key
primary key in a database
specific data category
condition
business rule
numerical value
alphanumerical value
alphabetic value
one single alphabet letter
one single word
sentence The following definitions for the codes, variables, or parameters should not be taken as limiting:

1. Type of information/content: A digital signage includes in the information transmitted a code that allows the RFID tag of a card to recognize/determine the type of information (e.g., product information, consumer brand, advertising, job posting, discount coupon code, rebate, promotion, cross selling, rewards points, gift points, emergency evacuation information, transportation schedule, etc.). Information/content with higher priority code can be stored first in the memory of an RFID tag before other types of information/content.
2. Location of a digital signage in the physical structure of the building or geographical area: A digital signage is able to transmit a code associated with a specific area of a building where it is located (e.g., floor, room, wall, x and y coordinates) or the specific geographic area (e.g., street address, geo-coordinates). Different digital signage associated with different locations can be assigned location codes representing different levels of priority to determine if their content/information should be stored before the information of other digital signage in the memory of an RFID tag.
3. Movement of the card: A code can signify that the card is moving. Another can signify that the card is not moving.
4. Location of the digital signage relative to an entrance, exit, stairwell, walkway, or corridor of a building: A digital signage is able to transmit a code associated with the side of the entrance of a building where it is located, such as left side, right side, or above top frame of the door, etc. Different digital signage with different locations can be assigned location codes representing different levels of priority to determine if their content/information should be stored before the information of other digital signage in the memory an RFID tag.
5. Currency amount: If the currency amount in the information is equal to, below, or above a certain number, the digital signage is capable of assigning a specific code, variable, or parameter. An RFID tag is capable of storing in its memory only currency amounts equal to, below, or above a specific amount.
6. Rebate/Discount percentage: If the percentage in the information is equal to, below or above a specific number, a digital signage is capable of assigning a specific code, variable, or parameter. An RFID tag is capable of storing in its memory only percentages equal to, below, or above only a specific percentage.
7. Expiration Date: If the information transmitted contains an expiration date, a digital signage is capable of assigning a specific code signifying whether the expiration date has passed the current date/time or not. Another code can signify the amount of time left before the expiration date. An RFID tag is capable of avoiding storing outdated information/content.
8. Date of validity, start date, creation date, or activation date: If the information transmitted contains an activation date, a digital signage is capable of assigning a specific code signifying whether the activation date has passed the current date/time or not. Another code can signify the amount of time left before the expiration date. An RFID tag is capable of storing or not storing information/content based on this activation date.
9. Coupon number, promotion code: This can be included in the information transmitted and stored in an RFID tag. This coupon number can be later used when the person is making a purchase or performing a transaction using his/her card with an RFID tag.
10. Threat level or severity level of an emergency incident occurring in the building or geographical area: A digital signage is capable of assigning a specific code based on the severity of the incident.
11. Type of organization sending/originating the information: The information/content can be sent by or on behalf of an advertiser, merchant, seller, media company, first responder agency, building management, building security, etc. A digital signage is able to assign a code that represents the type of organization. Types of organizations with higher priority codes will have their content/information stored before the codes of other organizations. For example, first responders agencies may be given higher priority codes.

12. Name of the organization, department, entity, or person: A digital signage is capable of assigning a code specific to the originator or owner of the content. Organizations, departments, entities, and persons with higher priority codes will have their content/information stored before other organizations' codes.
13. Event and/or holiday: A digital signage is capable of assigning a code specific to a holiday or event.

A code can be assigned a certain weight factor, which can be taken into account when the RFID tag that is part of the card evaluates whether to store or not to store the information received from the digital signage. Codes with a higher weight factor can override other codes which were transmitted previously have more significance in the content targeting, personalization and management (CTPM) algorithm A digital signage, functioning as an RFID reader, is capable of transmitting information/content a specific number of times within a given time duration and/or time interval to the RFID tag. For example, information can be transmitted five times within a two second time duration and/or every ten seconds. The combination of the number of transmissions, transmission time duration, and the transmission time interval can be associated with a specific code.

An RFID tag can be programmed so that when it receives a specific code from an RFID reader of a digital signage, the RFID tag is capable of transmitting its tag number and/or other parameters a certain number of times based on a time interval that is specific to that code. The digital signage will interpret that as a confirmation that the information/content should or should not be transmitted to the RFID tag. For example, when the RFID tag receives, from a digital signage, codes associated with emergency information or a merchant's discount coupon, the RFID tag can be programmed to:

Transmit two times its tag number and/or other parameters every five seconds to indicate to the RFID reader of the digital signage that it will ACCEPT a merchant's discount coupon and, therefore, the digital signage will transmit it.

Transmit four times its tag number and/or other parameters every five seconds to indicate to the RFID reader of the digital signage that it will REJECT a merchant's discount coupon and, therefore, the digital signage will not transmit it.

Transmit four times its tag number and/or other parameters every three seconds to indicate to the RFID reader of the digital signage that it will ACCEPT emergency information and, therefore, the digital signage will transmit it.

Transmit eight times its tag number and/or other parameters every three seconds to indicate to the RFID reader of the digital signage that it will REJECT the emergency information and, therefore, the digital signage will not transmit it.

Transmit six times its tag number and/or other parameters every three seconds to indicate to the RFID reader of the digital signage that it will ACCEPT another type of information and, therefore, the digital signage will transmit it.

Transmit nine times its tag number and/or other parameters every three seconds to indicate to the RFID reader of the digital signage that it will REJECT another type of information and, therefore, the digital signage will not transmit it.

An RFID tag is able to store one, or more, or all of the following data in its memory:

The list of codes it has received from one or many digital signage

The list of codes it has not stored

The date and time those codes were stored or attempted to be stored

The identity of the digital signage and other detailed information about the digital signage The identity of the RFID readers inside or on the digital signage and other detailed information about the RFID readers The content/information received from one or many digital signage The presence of an RFID tag within the read range/distance of a digital signage equipped with RFID reader(s) can display or play targeted and personalized content such as but not limited to:

Transportation itinerary and transportation schedule (flight/train arrival or departure) of the owner of a card having an RFID tag Advertising and promotions News Entertainment Information about products on sale Building emergency information, such as turn-by-turn directions to exit from the building, to find emergency equipment, to reach specific locations within the building The content targeting personalization and management (CTPM) algorithm also takes into account the combination of multiple codes within the same transmission of content/information in order to determine whether the information should be stored in the RFID tag or not.

Other factors are taken into account, such as the balance amount left on the card. If the balance is equal to, below or higher than a specific amount, the RFID tag can store the discount amount or rebate percentage that the card owner will receive for the next purchase or transaction the card owner will execute.

It is expected that a person carrying an RFID tag will be walking by or standing near more than one digital signage inside a building or geographical area. Under certain conditions, the RFID tag will have the capability to receive simultaneously information from different digital signage and exchange information with only one digital signage based on the code(s) it received from that particular digital signage. The codes transmitted by each digital signage, functioning as an RFID reader, can be evaluated by the RFID tag using the content targeting personalization and management (CTPM) algorithm to determine:

In what specific order the different content/information received from different digital signage should be stored in the RFID tag memory.

Which content/information from different digital signage should not be stored.

Which significance, level of importance, or priority each content/information from each digital signage should be assigned before it is stored in the RFID tag memory. This can be useful when the memory of the RFID tag is limited or full.

Another aspect of the content targeting personalization and management (CTPM) algorithm is for the RFID tag to compare the information being received against the information already stored in the RFID tag. This is performed by comparing the information being received with the date/time stamp associated with the code and information currently stored. Depending on conditions and business rules, the RFID tag is able to store the content/information:

More than once if it is received from the same digital signage and/or different digital signage.

Only one time and reject subsequent transmissions of the same content/information from the same digital signage and/or from different digital signage A specific number of times (e.g., cap)

Codes, variables, or parameters can be used to determine the travel direction of an RFID tag. In a building or geographic area where multiple digital signage, functioning as RFID readers, are positioned and/or standalone RFID readers connected to a remote and/or centralized system are positioned, the RFID tag is capable of receiving a series of codes associated with the locations of the respective digital signage, functioning as RFID readers, which transmitted them. The order by which the codes are received by the RFID tag of the card enables a computerized system that manages the building floor plans and the area physical structure to determine the travel direction of the person carrying the card. For example, one digital signage, functioning as an RFID reader located on the wall/door side facing the outside of the building, sends its code to the RFID tag and this is followed by a code from a second digital signage, functioning as an RFID reader, located inside the building. Then the sequence of the code associated with the first digital signage and then the code associated with the second digital signage determines that the person has entered the building. If the sequence is the code associated with the second digital signage followed by the code associated with the first digital signage, then it can be determined that the person has exited from the building.

A digital signage, functioning as an RFID reader, is capable of keeping track of the amount of time the person carrying the card is detected. The RFID reader of the digital signage can be calibrated to detect RFID tags within a certain read range/distance. If an RFID tag is within range for a certain duration, then the digital signage can include this duration as a variable or a parameter or assign a specific code for it. This will be included in the computation of the content targeting personalization and management (CTPM) algorithm calculation. The results of the computation can make the digital signage:

Display or not display content/information

Stop displaying content/information

Display additional and similar content/information

Display a specific type of content/information next time the RFID Tag is within a certain read range/distance of the same Digital Signage or different Digital Signage.

A digital signage can be equipped with more than one RFID reader. The position of where an RFID reader is installed is used to determine which side of the digital signage the RFID tag of the card is closest to (e.g., left side, right side, center, bottom, or top of the screen etc.). This position of the RFD tag of the card vis-a-vis the screen is used:

To determine which part of the digital signage screen, the content/information will be displayed. For example, the content/information is displayed on the left side of the screen if the RFID tag is closest to the left RFID reader compared to the other readers. This enables the digital signage to display more than one type of targeted and personalized content/information simultaneously to multiple persons carrying cards with RFID tags by dividing the screen in smaller sections. If only one RFID tag is detected within the read range/distance, then one targeted and personalized content/information will be displayed on the entire screen or section of the screen If multiple RFID tags are detected within the read range/distance of the digital signage, then the digital signage is able to evaluate the profiles (e.g., personal preferences, age, gender, socio-economic background, address, physiological characteristic stored its database) of the persons carrying the RFID tags. Among the events that can occur are the following:

If these individuals have similar, adjacent, close or exactly the same profiles, then the digital signage is capable of displaying the same content/information for them.

If these individuals have different profiles, then the digital signage is capable of displaying different content/information targeted and personalized for each person. Different content/information is displayed in a sequential order, starting with content/information targeted and personalized for the person most likely to respond to, react, and/or make a decision based on the content/information (as determined by his/her profile). The different content/information will be displayed sequentially until the last person carrying a card with an RFID tag is within read range.

While content/information is being displayed for a specific person or group of people, and they are no longer detected within the read range of the digital signage, then relevant content/information is displayed for the next person or group of people in the sequence of whose cards with an RFID tag are still being detected.

The RFID readers of a digital signage are able to determine which direction the RFID tag is facing based on one or more of the following criteria:

The antenna located inside the RFID tag.

Based on which side of the tag responds first to the transmission coming from the digital signage reader. The RFID tag is able to transmit a signal and communicate with the digital signage reader using electronic components located on the front/top side or using electronic components located on the back/bottom side of the card.

If the person is carrying the card with an RFID tag in his/her front pocket or on a lanyard around the neck and a specific side of the card is facing the digital signage, then this can be interpreted as the person looking at the screen and, therefore, the digital signage is capable of displaying targeted and personalized content for this person.

If the person has his/her back to the screen and the back side of the card is facing the digital signage, then one of the following can happen:

The digital signage will not display targeted and personalized content for this person.

The digital signage is able to display or play the beginning of the content and then pause for a given period of time, until the person turns around and faces the screen, which is equivalent of the front side of the card facing the digital signage. The digital signage may play a sound that is targeted and personalized for the person in order to get the person to turnaround and start displaying or playing the relevant content/information.

In public locations, such as shopping malls, airports, train stations, amusements parks, etc., public address systems are used for paging people. A digital signage can be used as an alternative or a complement to existing audio paging systems. A text, video, voice, or multimedia message is broadcasted from a central computer system to one, or some, or all the digital signage within a building or geographical area. The text, video, voice, or multimedia message is displayed or played when the person is within the read range/distance of a digital signage, functioning as an RFID reader. A message header, personalized for the person, is flashed on the screen until the person carrying the card with an RFID tag stops moving, or is motionless for a certain duration, or is facing the screen. Then the digital signage displays or plays the entire message.

The distance between a card, with an RFID tag, and one or more digital signage RFID readers is used to control the information/content being displayed by the digital signage. In RFID technology, there is a correlation between the Received Signal Strength Indicator/Indication (RSSI) and this distance. It is possible to estimate the distance between an RFID tag and an RFID reader based on the RSSI value. The stronger the signal received from a transponder (RFID Tag), the higher the RSSI value, and, therefore, the shorter the distance between that transponder and an RFID reader antenna. The weaker the signal received from a transponder (RFID Tag), the lower the RSSI value, and, therefore, the longer the distance between that transponder and an RFID reader antenna. The following techniques are other ways for this invention to be able to measure/estimate this distance:

Angle of Arrival (AoA)
    Line-of-sight (LoS)
    Time of Arrival (ToA)
    Time Difference of Arrival (TDoA)
    Received Channel Power Indicator (RCPI)
    Time of Flight (ToF)
    Two Way Ranging (TWR)
    Symmetrical Double Sided—Two Way Ranging (SDS-TWR)
    Near-field electromagnetic ranging (NFER)
    Real-Time Location Systems (RTLS)
    Advanced Signal Processing Algorithms to locate passive UHF RFID tags
    Using RFID with Back Scatter technology For the purpose of this invention, determining the exact distance with no margin of error is not necessary but rather the ability to record material changes in the distance.

The following are ways a digital signage is capable of receiving commands and be controlled by an RFID tag A digital signage, transmitting information to an RFID tag, is able to display on its screen a question asking the holder, if he/she wants to accept and allow the information to be stored in the RFID tag. For example "Would you would like to receive a $5 discount coupon on your card or mobile device from ACME restaurant? To ACCEPT, please step closer to the screen and to REJECT step back away from the screen."

The digital signage is able to display the RSSI value on the screen and the name of the owner or his/her alias. As the person steps closer to the screen, the RSSI value will be shown increasing and, as the person steps back away from the screen, the RSSI Value is shown decreasing.

The digital signage is programmed to transmit the information to the RFID tag when the RSSI value reaches a specific value/number that is higher than the RSSI value first shown when the question was displayed, or vice-versa. If desired, the RFID tag is also programmed to store the information when the RSSI value reaches a specific higher value/number.

The digital signage is programmed to not transmit the information to the RFID tag when the RSSI value reaches a specific value/number that is lower than the RSSI value first shown when the question was displayed, or vice-versa. If desired, the RFID tag is also programmed to not store the information when the RSSI value reaches a specific lower value/number.

In addition, the digital signage is programmed to transmit or not transmit the information to the RFID tag if the RSSI changes by a specified percentage or number.

To make this interaction more user friendly for the person, the digital signage is able to display the RSSI value in the form of graphics to make it easier to follow the instructions, such as a:

a volume bar that increases in size or decreases in size based on the RSSI value
    a horizontal bar/line with one extremity showing the word ACCEPT and the other extremity showing the word REJECT and a cursor or dot showing on the bar/line somewhere between the two extremities. So, as the RSSI value increases, the cursor is shown moving closer to the word ACCEPT until it reaches it, thereby indicating that information should be stored in the RFID tag. Alternatively, as the RSSI value decreases, the cursor is shown moving closer to the word REJECT until it reaches it, thereby indicating that information should not be stored in the RFID tag. Also, when the RFID tag leaves the read range/distance of the digital signage, this is translated as the person rejecting the information.
    a computer animated hand can be displayed on the digital signage and be animated in accordance with the RSSI level.
        The computer animated hand is able to move one of its fingers as a way to instruct the person with an RFID tag to step closer to the screen if he/she wants to ACCEPT the information. A text box next to the computer animated hand is able to provide translation of the movement into text for the person to read. A computer generated voice or human recorded voice instructions can also be played, synchronized with the movement of the computer animated hand, by the digital signage.
        When the person comes close enough (i.e., RSSI value reaches a desired level), then the computer animated hand is able to give a thumbs up to confirm that the information has been stored into the RFID tag.
        The computer animated hand is able to move one of its fingers as a way to instruct that the person carrying an RFID tag to step back away from the screen if he/she wants to REJECT the information. A text box next to the computer animated hand is able to provide translation of the movement into text for the person to read. A computer generated voice or human recorded voice instructions can also be played, synchronized with the movement of the computer animated hand, by the digital signage.
        When the person steps away far enough (i.e., RSSI value reaches a desired level), then the computer animated hand is able to give a thumbs down to confirm that the information has NOT been stored into the RFID tag.

A computer generated hand, as described above, can be substituted with a computer generated human accompanied by a human or computer generated voice or a computer generated mascot or logo or trademark of the organization sending or owning the information, accompanied by a human or computer generated voice. A final message is displayed on the screen to confirm if the information is stored or not in the RFID tag.

The digital signage is programmed so that a series of sequential and binary questions can be answered by the person based on changes in the RSSI value. At any time when an RFID tag enters the read distance/range of the RFID reader, one of those RSSI values can be used as a baseline. The digital signage is able to display the first question of a series:

- The first question can be answered based on changes in the RSSI value. For example, if the RSSI value changes by plus or minus 20, or plus or minus 10%, then one of the two possible answers to the questions can be answered. The person can be guided by a graphic or computer animation on the screen as previously described.
- The second question is then displayed on the screen and can be answered based on changes in the RSSI value using the same techniques as the first question.
- The third question is then displayed on the screen and can be answered based on changes in the RSSI value using the same techniques as the first question.
- And so and so until the last question is answered.
- Each question can be assigned an upper limit RSSI value and a lower limit RSSI value. This means that if the RSSI value stays within those two limits, then the question is displayed or reposted on the screen if the person has already answered it. When the RSSI value reaches one of the two limits, then the question is considered as answered. Those upper and lower limit values can be displayed on the screen or be substituted for by graphical/text display(s) to better guide the person.

The digital signage is programmed to instruct the person(s) within its read distance/range how to better position themselves and/or the RFID tag in front of the screen so that the answers to the questions are easier to submit. For example, if a person is too close to the screen (e.g., the RSSI value is too high or has reached its highest value and it can no longer increase), then the person can be instructed to step back away from the screen until the RSSI value has changed enough (e.g., is low enough).

The changes in the RSSI value, the graphical display, text display, computer animation, and the series of questions displayed on the digital signage can also be transmitted simultaneously to a web page that can be accessed via a mobile device carried by the person(s). For example, in situations where there are so many people in front of the digital signage that they all cannot see personalized instructions on the screen because it would be too cluttered, the digital signage is able to send a text message to the person(s) mobile devices with a hyperlink (web address) that they are able to click on to access the web page where the personalized instructions are provided in real-time. If the email addresses or cell phone numbers of the person(s) are unknown by the system, then the web address of the web page can be displayed on the digital signage instructing them to type it on the web browser of their device, so they can get to the web page. The digital signage is programmed to:

- send out the emails and text messages with hyperlinks every time there is a person in the read distance/range of the reader(s) of the digital signage or based on the number of RFID tags detected (e.g., threshold) by the reader(s) of the digital signage.
- direct the overflow of people to nearby digital signage which are less inundated, so they are able to receive information/content on their RFID tags.

When multiple people, from the same organization or who share the same preferences or who have similar user profiles, are within the read range/distance of the digital signage reader(s), then the digital signage is capable of displaying or playing a common greeting to welcome them (e.g., "Welcome New York Jets Football Fans . . . " can be displayed on the screen or play using a computerized voice). If the RFID tag of only one person is detected by the digital signage reader(s), then the welcome greeting can be more specific and highly personalized. (e.g., "Welcome John Doe, you're a New York Jets Fan . . . "). Alternatively, a non-personalized greeting can be also provided by the digital signage.

The aforementioned system and method for ACCEPTING or REJECTING the information can be applied simultaneously for multiple people carrying RFID tags at the same time within the read range/distance of a digital signage or multiple digital signage.

In some cases, the RSSI value can fluctuate up and down due to signal reflection or interference caused by the physical environment where the RFID readers of digital signage are located, for example, when excessive amounts of metal or liquid are present. A digital signage and/or its RFID reader(s) is capable of using a baseline RSSI value and compare it to the subsequent RSSI values captured from the same RFID tag. If the RSSI values are on a declining trend/pattern, but there are a few RSSI values which are above the baseline number, then the system is able to ignore those higher RSSI values and, therefore, consider the person carrying the RFID tag as moving further away from the digital signage. If the RSSI values are on an increasing trend/pattern, but there are a few RSSI values which are below the baseline number, then the system is capable of ignoring those lower RSSI values and, therefore, consider the person carrying an RFID tag as moving closer to the digital signage.

Other techniques besides the RSSI value can be used for ACCEPTING or REJECTING the information. These other techniques can be used to measure and estimate the distance between the RFID tag(s) and the RFID reader(s):

- Angle of Arrival (AoA)
- Line-of-sight (LoS)
- Time of Arrival (ToA)
- Time Difference of Arrival (TDoA)
- Received Channel Power Indicator (RCPI)
- Time of Flight (ToF)
- Two Way Ranging (TWR)
- Symmetrical Double Sided—Two Way Ranging (SDS-TWR)
- Near-field electromagnetic ranging (NFER)
- Real-Time Location Systems (RTLS)
- Advanced Signal Processing Algorithms to locate passive UHF RFID tags
- Using RFID with Back Scatter technology Size of the image is reduced when an RFID tag gets closer to a digital signage screen as the RSSI gets stronger or the opposite can be programmed to occur. Size of the image is increased as an RFID tag gets further away from a digital signage screen as the RSSI gets weaker or the opposite can be programmed to occur.

A person carrying an RFID tag is able to zoom-in into the image displayed as his/her RFID tag gets closer to the screen and the RSSI gets stronger or the opposite can be programmed to occur. A person carrying an RFID tag is able to zoom-out of the image displayed as his/her RFID tag gets further away from the screen and the RSSI gets weaker or the opposite can be programmed to occur. The aforementioned methods are used to also control the volume level of the digital signage and the speed by which the content/information on the digital signage is displayed or played.

Another way to ACCEPT or REJECT the information is for the digital signage to send a text message or email to the person's mobile phone or email address. The person is able to ACCEPT the information to be stored in his/her RFID tag by typing ACCEPT and replying to the electronic message. The person is able to REJECT the information to not be stored in his/her RFID tag by typing REJECT and replying to the electronic message. The digital signage is able to prompt the person to tap on the screen to ACCEPT or REJECT the information.

A person carrying an RFID tag is able to make a purchase directly from the digital signage based on the system and method described above. The words "ACCEPT" and "REJECT" can be replaced with other words such as "BUY" and "NO THANX"

The location of an RFID tag vis-a-vis one, or some, or all of the RFID readers of the digital signage is used to control the digital signage. A person is able to rewind the content by moving towards the left reader of the digital signage and then make the content move at normal speed by moving towards the RFID reader located near/at the center of the digital signage. A person is able to fast forward the content by moving towards the right reader of the digital signage and then make the content move at normal speed by moving towards the RFID reader located near or at the center of the digital signage.

If the digital signage is equipped with one RFID reader, then a person carrying an RFID tag moving to the left of the reader will rewind the content, or moving to the right of the reader will fast forward the content, staying directly in front of the reader will play the content at normal speed In situations where there are several people carrying cards with RFID tags within the read/distance of the digital signage reader(s), a large number of people can result in some RFID tags not being detected by the RFID reader(s). The human body, being made of 60% water, can reduce the RF signal strength. The following system and method provides the ability for RFID reader(s) to rely on one or a few detected RFID tags to detect other surrounding RFID tags, not detected by the RFID reader(s) and to send information/content to other surrounding RFID tags A digital signage RFID reader is programmed so that when it detects one or more RFID tags, it will send a command to them that will turn on their ability to detect other surrounding RFID tags. The RFID reader is capable of taking the area covered by its read range/distance and divide it into subareas of equal size. The digital signage RFID reader then selects one or more RFID tags inside those subareas and turns on their capability of detecting surrounding RFID tags. The RFID tags, with the capability of detecting other RFID tags, are referred to as "Enhanced RFID tags". The maximum number of occupants which fit inside the physical area where the digital signage is located is used to determine the number of RFID tags that can be turned into Enhanced RFID tags using a percentage or ratio formula. Alternatively, the digital signage RFID reader is capable of selecting an RFID tag located anywhere within its read range/distance.

The Enhanced RFID tags are capable of identifying other RFID tags in their surroundings and whether or not they are already communicating with an RFID reader. Regular RFID tags have the capability to also provide the identity and additional information about the RFID reader they are communicating with.

An Enhanced RFID tag is capable of retransmitting the codes it has received from a digital signage RFID reader to other surrounding RFID tags. For example, if an Enhanced RFID tag has received from an RFID reader a code associated with a specific organization or product or advertising or something else, the surrounding RFID tags will compare those codes received with their existing codes. If there is a single match or a plurality of matches, then the surrounding RFID tags will respond to the Enhanced RFID tag by indicating there is a match and, therefore, to ACCEPT the information related to the code, such as a merchant's discount coupon (i.e., digital coupon) information and/or advertising.

An Enhanced RFID tag has the capability of creating a list of other RFID tags it has detected, both regular and enhanced, and transmit that list to RFID reader(s) of the digital signage by excluding the Enhanced RFID tags it has detected. Included in the transmitted list(s) are the matching codes of specific organizations, products, advertising, or other types of information.

The digital signage RFID readers will receive the list(s) transmitted by the Enhanced RFID tags and determine which RFID tags on the list(s) that are not yet in communication. The digital signage RFID readers transmit the information related to the matching codes and retrieved from the digital signage database or a remote database to the Enhanced RFID tags which retransmit it to their respective surrounding RFID tags. For example, if two surrounding RFID tags transmit the code of a consumer brand to any Enhanced RFID tags which retransmit the code to the digital signage RFID readers, then the digital signage is able to transmit a discount coupon (i.e., a digital coupon), retrieved from its database or a remote database, to those two RFID tags through the intermediary of any Enhanced RFID tag.

A digital signage is capable of enabling an RFID tag to become an Enhanced RFID tag while communicating based on different conditions or criteria:
- The first RFID tag that initiates communication with a digital signage RFID reader is capable of becoming an Enhanced RFID tag, or
- Only an RFID tag that communicates with a digital signage RFID reader that has a specific ID Number is capable of becoming an Enhanced RFID tag, or
- Selected RFID tags (e.g., every 25th RFID tag) that communicate with the digital signage RFID tag are capable of becoming Enhanced RFID tags, or
- Only RFID tags that communicate with a digital signage reader and are associated with persons of specific job titles, or roles, or tasks, or responsibilities are capable of becoming Enhanced RFID tags:
  - During an emergency situation, the RFID tags, carried by Fire Wardens, Floor Wardens, Security Guards, or Rescue Workers and detected by standalone RFID readers, or digital signage RFID readers, or building devices RFID readers can be the only RFID tags enabled to function as Enhanced RFID tags
  - For sales and marketing activities, the RFID tags, carried by representatives of the organization selling a product or service, can be the only RFID tags enabled to functions as Enhanced RFID tags A card with an RFID tag is capable of storing multiple digital coupons from different merchants. When an owner of an RFID tag goes shopping, the RFID reader(s) installed in each store is capable of only reading and validating the digital coupons distributed by the organization which owns the product or service that the digital coupon is related to. Digital coupons that are stored in an RFID tag can be uniquely associated to one or a combination of the following:

- a specific merchant or group of merchants
- a specific product or service
- a group of products or services
- an RFID reader(s) of a specific shop. This means that when the owner of the card with an RFID tag goes into that specific shop to make a purchase, only the RFID reader(s) associated with that shop are able to read, validate, and apply the digital coupon towards a purchase. The RFID reader(s) in a shop can be standalone or connected to a point-of-sale system or part of a point-of-sale system. In addition, RFID reader(s) in a shop can be used for deleting or changing the digital coupon from the RFID tag.
- RFID reader(s) associated with a group of shops. This means that when the owner of the card with an RFID tag goes into one of those shops to make a purchase, only the RFID reader(s) associated with that shop are capable of reading, validating, and applying the digital coupon towards a purchase. The RFID reader(s) in a shop can be standalone or connected to a point-of-sale system or be part of a point-of-sale system. In addition, RFID reader(s) in a shop can be used for deleting or changing the digital coupon from the RFID tag.
- a specific group of RFID reader(s) within a shop. This means that when the owner of a card with an RFID tag goes into the shop to make a purchase, only that specific group of RFID reader(s) associated with that shop can read, validate, and apply the digital coupon towards a purchase. The RFID reader(s) in a shop can be standalone or connected to a point-of-sale system or be part of a point-of-sale system. In addition, RFID reader(s) in a shop can be used for deleting or changing the digital coupon from the RFID tag.

The system and method described above will prevent the same digital coupon being used with different merchants. In other words, the digital coupon is made RFID reader specific or specific to RFID readers within the same group.

An RFID tag is capable of transmitting codes and other data parameters to the digital signage in order to display or play personalized and targeted information/content based on the preferences of the owner of the card with the RFID tag. The card RFID tag is programmed to store the codes and other data parameters related to a specific organization, merchant, product, service, type of information, type of event, building, geographic area, building floor, area within a building, subarea within a geographic area, event, holiday, person, etc. When these codes and/or other data parameters are received and validated by the digital signage, then the digital signage is able to display the relevant information/content.

Users of the present invention are able to submit and update their own personal preferences by accessing a web site via a desktop computer or personal mobile device. The new or changes made to the personal preferences are then stored in a database of digital signage or in a remote database connected to multiple digital signage. When users are within the read range/distance of the digital signage RFID reader(s), then the digital signage can display or play personalized and targeted content and transmit the personal preferences to the RFID tag which will store the personal preferences.

A large number of RFID tags within the read distance/range of a digital signage RFID reader(s) might cause a communication bottleneck which can prevent the RFID readers from detecting or being able to communicate with all card RFID tags. The following conditions and rules can be applied in order to prioritize the wireless communication.

Based on the codes and/or other data parameters transmitted by the digital signage, when an RFID tag evaluates those codes and responds to the digital signage indicating that it wants to ACCEPT information/content from the digital signage, then, if the information/content has a priority code higher than other types of information being transmitted at the same time to other RFID tags, the digital signage is programmed to ensure that the information/content is first received and stored by that RFID tag. This can be done by the digital signage RFID reader(s) stopping and/or delaying the transmission of lower priority information/content to other RFID tags. This also can be done based on the codes and other data parameters transmitted by the RFID tag to the digital signage and the digital signage is capable of evaluating all the codes and data parameters received in order to rank them from highest to lowest priority information/content. Based on this ranking, the digital signage is able to then transmit the different digital coupons and/or other information/content to the RFID tags. Priority codes can also be assigned based on the:

- currency value of the digital coupon and/or information being transmitted
- percentage value of the digital coupon and/or information being transmitted
- the fees paid by a merchant or advertiser to the organization which owns the digital signage or is responsible for distributing the information
- price of the product and/or service which is associated with the digital coupon
- priority fee paid by a merchant or advertiser to the organization which owns the digital signage or is responsible for distributing the information
- other parameters and other factors as previously described above An RFID tag will have the capability to store, in a chronological order, the location of the last or last few RFID reader(s) with which it has communicated. A partial list of data points that can be stored in a RFID tag memory includes the location of an RFID reader in a building or a geographical area and the date/time of the last communication with the last or last few RFID readers.

The last known location(s) stored in an RFID tag memory can be retrieved by another RFID reader brought in from outside a building or a geographic area. For example, in situations where RFID readers are no longer operating or unable to communicate with an RFID tag, a laptop or PDA or PC equipped with an RFID reader can be brought in to scan the presence of RFID tags. This is particularly useful during disasters such as earthquakes or other incidents that disrupt the proper functioning of RFID readers installed in a building or geographical area.

In situations where the digital signage indicates that there is information, such as acceptance of a digital coupon, and the user does not want this information, the user is able to send a command via text message Short Message Service (SMS) containing "NO" to the digital signage or a central system to delete the information from the RFID tag.

Within a facility or geographical area where multiple RFID readers are installed to track the movements of the occupants, for example their locations, entries and exits points, entries and exits date-time, some of the RFID readers are installed throughout the facility (inside the four walls of the facility) and other RFID readers are installed near the extremities of the building (e.g., entrances or exits) or on the peripheries of the building (e.g., externally facing sides of the walls, rooftop, fence, at the emergency evacuation assembly point). Occupants, moving around the facility and equipped with RFID tags, are detected by the RFID readers. The RFID readers are able to transmit their locations and positions (e.g., geometric or geospatial coordinates) in the physical area to the RFID tags which are able to store them in their memories. As occupants travel throughout the facility, the RFID tags that they are carrying are capable of storing in their memories the respective locations and positions of the RFID readers they pass by. Other RFID tags are able to store in their memories the itinerary of the occupants. An emergency event, a loss of power, a loss network connectivity, or an incident can cause the RFID readers to stop functioning and, therefore, be unable to detect the RFID tags. The RFID tags are able to broadcast their most recent location and position and the itinerary that they have stored. The RFID tags are programmed to broadcast this information when they lose communication with the RFID readers, or after a certain amount of time has passed and they are not able to communicate with an RFID reader. If there are occupants who are trapped in the building, a rescue worker or a first responder located outside of the building and equipped with a mobile device or personal computer which is able to function as an RFID reader, is able to receive the locations and positions stored in the RFID tags carried by the trapped occupants.

An RFID tag is capable of storing electronic 2D or 3D images such as (but not limited to) a picture of the person carrying the RFID tag. So, in addition to being capable of broadcasting the most recent location and position of an RFID tag and an itinerary that may have been stored, an RFID tag can also broadcast a picture of a person which is received, stored, and displayed on the mobile device of a rescue worker or of another occupant. A 2D image or 3D image representation of a person can also be received, stored, and displayed by an external and remote system, and/or a central system.

Some of the RFID readers are installed throughout a facility (inside the four walls of the facility) and other RFID readers are installed near the extremities of the building (e.g., entrances, exits, rooftop) or on the peripheries of the building (e.g., externally facing the side of a wall or fence) or at the evacuation assembly point, also known as the muster point. A muster point is a rendezvous point where occupants are ordered to assemble when there is an emergency evacuation. When RFID readers, located inside the facility, detect and communicate with RFID tags located inside, they are capable of forwarding the list of RFID tags that have been detected to the RFID readers located at the peripheries of the building and at the muster points. The RFID readers on the peripheries and at the muster points are able to store in memories of the RFID readers the information received from the RFID readers inside the facility. The following information is captured and forwarded by the inside RFID readers to the outside RFID readers:

Each RFID tag unique identification number

Information about the person associated with the RFID tag (first and last name, title, role, employee ID, driver license number, Social Security number, student ID, electronic picture of the person, etc.)

Number of RFID tags detected by each RFID reader

Locations and positions of each RFID tag

Itinerary of each RFID tag

Under normal conditions, the RFID readers will transmit, to an external and remote system and/or a central system, via a wired or wireless network, the list of RFID tags that they have detected. The external and remote system and/or the central system includes a database which manages detailed information about building floor plans, occupants, evacuation information, and provides the capability of generating safety and accountability reports about the safety, location, and medical condition of the occupants. The external and remote system and/or the central system can be accessed by building management, security guards, and first responders during emergency evacuation. During an emergency situation, the communication between the RFID readers and the external and remote system and/or the central system can be terminated or interrupted. A rescue worker or a first responder, equipped with a mobile device or personal computer that includes an RFID reader, can retrieve the information stored in the memories of the RFID readers located on the peripheries of the building and at the muster points. This capability is critical when RFID readers detect the entries, exits, and locations of occupants carrying RFID tags, but they are not able to transmit that information to the external and remote system and/or the central system. In an earthquake situation, where the building collapses, building occupants can be trapped under the rubble. Therefore, the RFID readers located on the rooftop or external side of the walls or fence can be accessed to retrieve the list of RFID tags. The rationale is that if the building has collapsed, the rooftop and the external walls will most likely be laying on top of the rubble and, therefore, easier to reach by the rescue workers.

Additionally, the RFID readers located inside the building on different floors are capable of transmitting the information that they capture in their memories to the RFID readers located on other floors in the building. For example, information can be transmitted from RFID readers on one floor to RFID readers on the floor above, and so on, until the RFID readers on the last floor or rooftop have received and stored the information. Also, each RFID reader located inside the building is capable of transmitting to RFID readers located at the four peripheral corners of the building stored information received from RFID tags closest to the RFID reader. Furthermore, each RFID reader located inside the building is capable of transmitting to RFID readers located at a fire hydrant, a landing area of a medical helicopter, or a parking spot for a fire department truck stored information received from RFID tags.

When a digital signage detects an RFID tag embedded in an ID card, the RFID tag is activated and is capable of transmitting information stored in its memory to the RFID readers of the digital signage. The information received from the RFID tag is used to display customized and personalized content on the digital signage screen. The following types of information can be transmitted by the RFID tag:

If the RFID tag is part of a driver license, then the tag is able to transmit information that is generally printed on or associated with a driver license, such as the person's address, gender, license number, date of birth, physical characteristics, body sizes, body measurements, bar code, and contact information. This transmitted information is used by the digital signage and/or by a centralized system connected to the digital signage to display customized and personalized content for the person to whom the driver license belongs. The RFID tag is also capable of transmitting electronic images (pictures of a person or other things) to the RFID readers of the digital signage. These images are received, stored, and displayed by the digital signage. These images, along with the person's body measurements and characteristics, can be embedded in the personalized advertisement or information displayed on the digital signage. For example, an advertisement of an apparel company can show a mannequin in clothes with the face of the person carrying the RFID tag.

If the RFID tag is part of a loyalty card, membership club card, membership rewards card (e.g., American Express Membership Rewards), and the like, then the RFID tag is able to transmit information generally printed on or associated with the card, such as the total number of loyalty or rewards points accrued by the owner of the card, the identity of third party merchants/partners/brands which are parts of the loyalty program with each participating merchant assigned a unique code, the number of loyalty or rewards points earned from each participating merchant in the loyalty program by the member, the owner's loyalty account number or card number, the owner's electronic picture(s), the owner's address or part of the address, the owner's list of preferred merchants that are selected by the owner or based on the owner's profile.

The information transmitted by an RFID tag is used to display customized and personalized content. For example, the digital signage can display customized and personalized content for the member if the:

total number of loyalty or rewards points earned by the person is equal to or is below or exceeds a specific number of points.

number of loyalty or rewards points earned by the person from a specific merchant is equal to or is below or exceeds a specific number of points.

aggregate number of points earned from a combination of merchants is equal to or is below or exceeds a specific number of points.

the entire address or part of the address (street address, city, state, zip code, country, etc.) matches with specific criteria that the digital signage needs to receive from the RFID tag.

If a person wants to receive information to be stored in the memory of his/her RFID tag, but the RSSI value stays constant (which makes it impossible to accept the information), then the person carrying the RFID tag is instructed by the digital signage to step back away from the digital signage until the RSSI value changes to a lower value. This lower RSSI value is used as the new benchmark value. Then, the digital signage instructs the person to step forward in order to indicate that he or she wants to store the information in the memory of the RFID tag. Alternatively, the digital signage can instruct the person to step backward in order to indicate that he or she does not want to store the information.

If a person wants to receive information in an RFID tag, but the RSSI value stays constant (which makes it impossible to accept the information), then the person carrying the RFID tag is instructed by the digital signage to step forward toward the digital signage until the RSSI value changes to a higher value. This higher RSSI value is used as the new benchmark value. Then the digital signage instructs the person to step forward in order to indicate that he or she wants to store the information in the memory of the RFID tag. Alternatively, the digital signage can instruct the person to step backward in order to indicate he or she does not want to store the information.

The present invention can be arranged for real-time bidding and auctions. The RFID readers of digital signage and the digital signage itself are able to keep track of the sequence of arrival of RFID tags within the read distance or the order by which the RFID tags are detected by the RFID readers. The list is used to establish the sequence of displaying personalized content for each one of the persons carrying the RFID tags. The first RFID tag in the list which is detected by the RFID readers will trigger the display of personalized content by the digital signage. The personalized content, associated to the remaining RFID tags on the list, will be sequentially queued and displayed. While the personalized content associated with the first RFID tag is being displayed, the personalized content associated with the remaining RFID tags can be determined as follows.

The present invention is capable of managing real-time auctions from participating merchants in a loyalty program or non-participating merchants. A digital signage transmits the list of RFID tags detected by digital signage reader(s) along with the data transmitted from the RFID tags to a centralized electronic auction management system which is part of this invention. This information is used to enable the merchants to place bids in order to display personalized content or transmit information (e.g. advertising and/or digital coupons) for each RFID tag or a group of RFID tags detected by the RFID readers of the digital signage. Once the winning merchant is selected, the electronic auction management system transmits to the digital signage information about the winning merchant, the advertisement to display, and/or digital coupon to transmit.

A digital signage transmits the list of RFID tags detected by its reader(s) along with the data transmitted from the RFID tags to a centralized electronic auction management system. The electronic auction management system is capable of using the information received from a first digital signage and requests a bid for personalized advertising to be displayed and/or a digital coupon to be transmitted by other digital signage. The first digital signage will provide instructions to the persons carrying the remaining RFID tags as to which digital signage and its location they should go to watch the personalized advertising and/or receive digital coupons on their RFID tags. This avoids people having to wait in line in front of the first digital signage in order to receive the personalized information. The order of arrival or detection of the remaining RFID tags is used to assign which digital signage each person should go to. The distances between the first digital signage and the other digital signage are used by the first digital signage to determine the closest digital signage where to instruct a person with an RFID tag to go to. The first digital signage is also capable of determining which digital signage in the same facility or geographical area are idle (no personalized content being displayed or transmitted) in order to send people to only those ones.

Different types of auctions, such as reverse, Dutch, and English, are enabled by the electronic auction system according to the present invention.

Referring to FIG. 1, the key electronic components of the RFID tag are:

Radio Frequency chip, preferably based on the 6LoW-PAN protocol. However other radio frequency chips based on other wireless protocols can be used.

Near Field Communication (NFC) chip

Electronically Erasable and Programmable Read Only Memory (EEPROM) chip

Other secondary components, such as capacitors, resistors, inductors, and batteries also are included. FIG. 2 is a sample Bill of Materials.

An example of a 6LoWPAN Radio Frequency chip (System On Chip) that can be used is Atmega128RFA1 manufactured by Atmel. Atmega128RFA1 is a transceiver that operates on 2.4 GHz frequency. It is used to include the 6LoWPAN functionality in the tag. The Physical Layer and Medium Access Control are defined by IEEE802.15.4. This standard defines 16 channels in the 2450 MHz frequency band. The chip can send RSSI values and support all other features defined by IEEE 802.15.4 standard. Out of the 16 channels available in the band, channels 15, 20, 25, 26 (numbered from 11-26) do not overlap with the Wi-Fi channels. The chip can support data rates of 250 Kbps, 500 Kbps, 1 Mbps, 2 Mbps.

An example of a Electronically Erasable and Programmable Read Only Memory (EEPROM) chip that can be used is AT24C1024B manufactured by Atmel. AT24C1024B is an electronically erasable and programmable read only memory (EEPROM) that can support approximately 1,000,000 read/write cycles. This chip has two address pins A1 and A2 that can be programmed according to the desired selection. This memory is used to read and write information which is exchanged between the RFID tag and the RFID router, such as personalized digital coupon information, date and time when detected, location of the RFID tag within the physical area, and various other content. Some part of the memory is also used to store data captured via the NFC chip.

An example of a Near Field Communication (NFC) chip that can be used is PN5310A3HN/C203 (PN531-µC based Tx Module manufactured by NXP Semiconductors Philips). PN513 is a near field communication chip that supports various standards, such as contactless communication based on the ECMA340 (NFC IP1) Interface and protocol standard, the ISO14443A reader, and FeliCa reader protocol. NFC IP-1 is also standardized in ISO/IEC 18092. It supports peer-to-peer communication for direct data exchange between two devices. The devices are kept close, less than 5 cm apart. The two modes in NFC are Active and Passive. Active NFC Mode means both the initiator and the target are using their own RF field for the communication. Passive NFC Mode means that the target answers to an initiator command in a load modulation scheme. The initiator is active, namely generating the RF field.

In describing the block diagram of FIG. 1, it should be noted that electronic hardware components having similar capabilities and specifications can be substituted for the electronic hardware components that are illustrated.

The following is a description of the operation of the key electronic hardware components of the FIG. 1 block diagram and the data flow between the key electronic hardware components of the FIG. 1 block diagram.

The antenna of RFID tag 10 receives data from the RFID reader 12 of a digital signage. This data, sent by RFID reader 12, can be, for example, a digital coupon, the location of the RFID reader, the date, and the time.

The data received by the antenna of RFID tag 10 is conducted to the 2.4 GHz transceiver 14, as represented by bidirectional arrow 16, that is on the Atmega 128RFA1 RF chip 18 which is a System on Chip (SOC). Transceiver 14 converts the analog signals to digital data. The received packets are buffered in the 128-bit RAM 16K 20 allocated for the transceiver 14. This data flow is represented by bidirectional arrow 23.

This data is decrypted by the 128-bit AES engine present on the transceiver block 14 utilizing the microcontroller interface. This is represented by bidirectional arrow 24.

The decrypted data is then processed to extract the useful information from the packet and this is done by the AVR CPU 26. The data (e.g., digital coupon, RFID reader location, date, time) is stored temporarily in the RAM 20 through the interface as represented by bidirectional arrow 22. The extracted data is then used by the code written by the user through interface 22.

According to the instruction of the firmware program, data is either updated in the internal EEPROM 28 via the interface as represented by bidirectional arrow 30 or sent to the external EEPROM 32 using the Serial Peripheral Interface (SPI) 34 as represented by bidirectional arrow 36. The SPI 34 is used to communicate with external components (i.e., those outside the RF chip 18). By setting the appropriate pins, SPI 34 is enabled and the data is written on the EEPROM 32 via the interface as represented by bidirectional arrow 38.

Data stored in the external EEPROM 32 (e.g., loyalty card membership number, driver license information, student ID information, personal information, personal address) is retrieved using the SPI 34. In order to access data from Internal EEPROM 28, CPU 26 uses interface 30 and retrieves the data.

The CPU 26 processes this data to form packets and puts it in the RAM 20 using interface 22. The transceiver 14 encrypts these packets using the 128-bit AES engine present on the transceiver block 14 and the CPU 26 using interface 24. The encrypted packets are buffered for transmission in the RAM 20 through interface 23. This digital data is converted into analog signals and sent to the antenna of the RFID tag 10 as represented by bidirectional arrow 16 and the antenna transmits the data to the router of the RFID reader 12 of the digital signage.

The 13.56 MHz field detector 40 is used to communicate with the contactless payment reader 42 at a point-of-sale terminal to transmit, for example, a digital coupon, financial, banking and/or credit card information. The data flows in and out of the RFID tag 10 via interface 44.

The data that is being transmitted to the contactless payment terminal 42 is processed by the CPU 26 and also is stored temporarily in the RAM 48 as represented by the bidirectional arrow 46. According to the instructions of the firmware code, the necessary data (e.g., digital coupon) is read and written from the external EEPROM 32 as represented by bidirectional arrow 50. This data, written by the NFC chip 52 on external EEPROM 32, can also be accessed by the AVR microcontroller of the RF chip 18 via SPI interface 34 and interfaces 36 and 38. The NFC chip 52 can access the internal EEPROM 28 of the RF chip 18. RF chip 18 can also transfer data directly from its internal EEPROM to the memory of NFC chip 52 via interface 53.

The following is an example of establishing the connectivity between a digital signage router 12 and an RFID tag 10:

Step 1—

Multiple RFID routers 12 of a digital signage will send parameters to the same RFID tag 10 and the RFID tag will decide which RFID router to connect to.

Parameters that can be included in the frame of the beacon sent by a router 12 are:

Router address, which is expressed in binary or hexadecimal, can be stored in the chip memory. Then, if it receives a beacon from the same router, it will associate itself with the router.

Number of existing associations to the router and the number of spots left (unused associations) on the router.

Whether or not the maximum number of associations has been reached (True or False). The RFID tag will not associate itself with that router.

A threshold number to put a limit on the number of associations that can happen.

If the maximum number of associations for a router is reached, then the router will stop sending beacon frames, but other command frames and data frames will continue. When one of the associations becomes available, then the router can start sending beacons again.

RFID tag 10 measures the beacon from the other routers 12. The RFID tag 10 evaluates all the signals of the different routers 12 and identifies which router sends the strongest signal and is able to associate itself with that router.

RFID tag 10 is able to calculate the distance to the router 12 by using intervals between frames or beacons ((TimeReceived−TimeSent)/Data Rate). Also taken into account is the Frame Control which indicates the starting point of a frame.

Router 12 can send its X and Y coordinates on map or geo-coordinates on a map to an RFID tag 10 and the RFID tag can store them.

Step 2—

The RFID tag 10 picks a router 12 and associates itself with it. The RFID tag 10 sends its ID and the last communication it had with any router 12. The RFID tag 10 can associate itself with the closest router 12.

The following is an example of establishing communication between two routers. If two routers are on the same network or Personal Area Network (PAN) and in the listening ranges of each other, then the two routers can exchange information directly; otherwise routing (as specified in 6LoWPAN standard) can be used to send information from one node to another. If the routers are on different networks or PANs, then the information is first sent to the edge router of the PAN. This edge router forwards the information to another network edge router and then this router will forward the information to the destination router.

The following relates to the transmission of advertising content and digital coupons in connection with the real-time auction feature of the present invention.

Definitions

Channel: A physical transmission medium in which the communication takes place, such as a wire or a multiplexed connection over a shared medium, such as a radio channel that is used to transmit information signal.

Frequency Band: Also called frequency range is a range of wave frequencies in which the communication will take place. For example LF or Low Frequency bands lie in the range of 30 kHz-300 kHz; similarly there are MF, UHF, etc.

Channel Bandwidth or Data rate: The throughput of data rate in bits per seconds.

Frequency: The number of occurrences of a repeating event per unit time. For example, the number of waves that pass a fixed point per unit time can be defined as frequency of a wave.

Some wireless protocols, such as the 802.11 family, have frequency bands that overlap with the frequency bands of 802.15.4 ZigBee and 802.15.4 6LoWPAN protocols.

The Physical Layer and Medium Access Control of 6LoWPAN are defined by IEEE802.15.4. This standard defines 16 channels in the 2450 MHz frequency band. A 6LoWPAN radio frequency chip can send RSSI values and support all other features defined by IEEE 802.15.4 standard. Out of the 16 channels available in the band, channels 15, 20, 25, 26 (numbered from 11-26) do not overlap with the 802.11 Wi-Fi channels.

Different channels are used by all the 802.11 family compared to 802.15.4 (ZigBee). 802.11a/n uses 5 GHz Frequency band, so it will not interfere with 802.15.4 (ZigBee). 802.11 b/g operate in a 2.4 GHz band. There are 14 channels in this band. North America does not allow the use of channels 12, 13, 14. While most of the countries are allowed to use channels 1-13, only channels 1, 6, 11 are used worldwide as they provide the least interference with any other channel, such as might occur when two devices are operating nearby in this frequency band.

Figure 3:
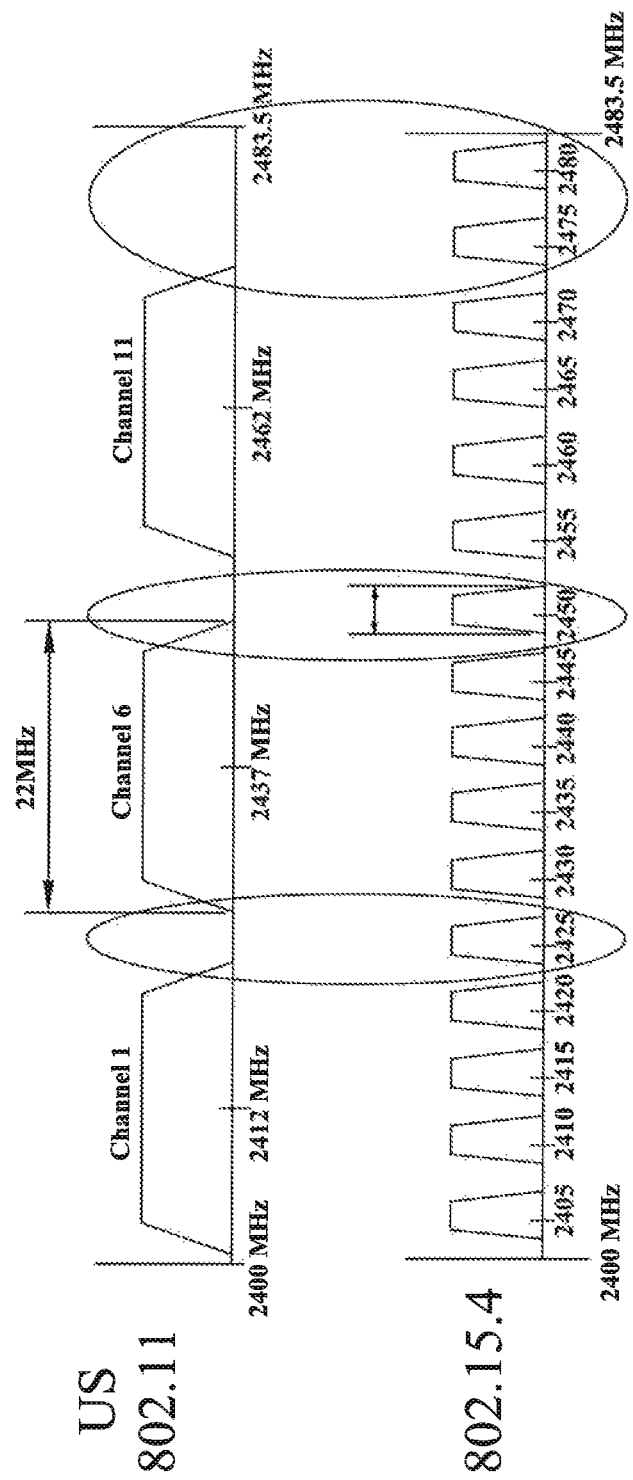
FIG. 3 illustrates frequency channels available for use in implementing the present invention.

FIG. 3 shows the available channels for 802.15.4 when compared to 802.11. Multiple RFID readers which operate on the same channel of the same wireless protocol (e.g., 802.11, 802.15.4 or proprietary wireless protocol) are not able to function properly when the range/perimeter of their transmission signals overlap with each other (interference). The RF technicians, who install RFID readers within a physical area, have to calibrate them so their signals do not overlap because RFID tags that receive signals from more than one RFID reader are not able to operate effectively in order to be detected by the readers. It is important to take into account the close physical proximity of RFID readers. Therefore RFID readers, operating on the same channel, are installed based on a specified distance so their signals do not overlap with each other.

One way to allow RFID readers, in close physical proximity of each other, to function properly is to have them operate on separate channels. A digital signage, with multiple RFID readers that operate each on a different channel, is capable of properly communicating with multiple RFID tags when the RFID readers are in close physical proximity (e.g., each reader is placed on each corner of the screen).

A digital signage, with RFID readers which are based on 6LoWPAN RF chips, can operate with each using one of the 16 channels within the 2450 MHz frequency band of 802.15.4 (6LoWPAN, ZigBee). Out of the 16 channels available in the band, channels 15, 20, 25, 26 (numbered from 11-26) do not overlap with the 802.11 Wi-Fi channels.

The present invention allows merchants and advertisers to participate in a real-time electronic auction or non real-time electronic auction in order to have their advertisements and digital coupons transmitted exclusively or non-exclusively via on one or more of the channels. The real-time electronic auction can be based on the channels 15, 20, 25, 26 of 802.15.4 (6LoWPAN, ZigBee) that do not overlap with the 802.11 Wi-Fi channels.

The real-time electronic auction system, which is part of the present invention, allows merchants and advertisers to place bids on one or more of the channels within the same wireless protocol in order to exclusively or non-exclusively transmit personalized content, ads, digital coupons, etc., to RFID tags that get detected by the RFID readers of one specific digital signage. A merchant or advertiser is able to bid for the right to transmit via one or more channels of the same wireless protocol based on different criteria, such as date and/or time, number of ads, number of digital coupons, data rate of the transmission, between the RFID tag and the RFID reader.

In physical areas, such as buildings or geographical areas where there are existing 802.11 Wi-Fi networks, the 802.15.4 channels that do not overlap with the 802.11 Wi-Fi channels (specifically channels: 15, 20, 25, 26) will be automatically chosen by the real-time electronic auction system to be bid on by leveraging the dynamic spectrum sensing capability of the RFID reader.

The digital signage is able to determine which 802.15.4 channels do not overlap 802.11 channels, as illustrated in FIG. 3 and as specified by the IEEE802.15.4 and IEEE802.11 specifications, within the physical area and communicate this to the real-time electronic auction system. In turn, the real-time electronic auction system presents only those channels to the merchants and advertisers, so they can place bids. The digital signage is able to determine which channels of a wireless protocol do not overlap with the channels of another wireless protocol within the physical area and communicate this to the real-time and non real-time electronic auction system. In turn, the real-time and non real-time electronic auction system presents only those channels to the merchants and advertisers so they can place bids.

The RFID readers of the digital signage have cognitive radio capability and dynamic spectrum sensing that allows for automatically determining which channels are useable, namely which channels are free, do not overlap, or provide the least interference with any other channel in a frequency band of a wireless protocol. The RFID readers of the digital signage have cognitive radio capability and dynamic spectrum sensing that allows them to automatically determine which wireless protocol is best to use within a physical area.

The RFID readers of a specific digital signage can also be programmed to transmit personalized content, ad, and a digital coupon using specific channels in a frequency band of a wireless protocol within a physical area, and/or a country. The policy engine of the cognitive radio within an RFID reader is configurable, so that it controls which channels within a frequency band of the RFID reader are allowed to transmit digital coupons to RFID tags.

A merchant or advertiser, who wins a channel auction, will be allocated a specific channel through which the RFID readers of the digital signage will communicate with the RFID tags that they detect and transmit digital coupons and/or other information to the RFID tags.

Based on the number of channels within a frequency band that are useable, a digital signage can automatically divide up its screen in multiple boxes (mini-screens) equal to the number of useable channels. Each box on the screen is associated with a channel and displays:
 non-personalized content,
 personalized content,
 non-personalized advertising
 personalized advertising
for the persons carrying the RFID tags detected by the RFID readers of the digital signage.

Based on the number of channels within a frequency band of a wireless protocol that are useable, multiple digital signage can each be associated with a unique channel in order to transmit digital coupons and/or other information to RFID tags.

Merchants and advertisers are also able to place bids on the number of concurrent associations between an RFID reader and multiple RFID tags that they would like to be allocated in order to transmit digital coupons and/or personalized ads. Given that multiple RFID tags can concurrently associate themselves (i.e., communicate) with the same RFID reader, there is a maximum number of possible associations for each wireless standard and/or wireless protocol.

The present invention enables merchants and advertisers to place bids on the number of associations that they would like to be allocated for them between the RFID tags and the RFID readers of a specific digital signage. Also, merchants and advertisers are able to place bids on the number of associations that they would like to be allocated between the RFID tags and the RFID readers of a group of digital signage. For example, the number of associations won in the auction will determine the number of digital coupons that can be transmitted concurrently or within a time frame or during the duration of an advertisement being displayed on the digital signage screen. Additionally, the maximum number of possible associations can be divided into blocks that the merchants and advertisers can choose to bid on. A block is a number of associations based on different criteria such as, but not limited to, a minimum bid price, a maximum bid price, type of content transmitted, time frame, date-time, duration, location, etc.

An RFID tag is programmed to store in its memory a list of channels within a frequency band where one wireless protocol or multiple wireless protocols operate(s). When an RFID tag is within the read distance of an RFID reader, the RFID tag will transmit a list of channels. Each channel from the list can be associated to a specific parameter such as:

a product or service category (e.g. food, beverage, non-food, news, entertainment, etc.): This means that when an RFID tag is detected by an RFID reader, it will transmit a list of channels. If the RFID reader is programmed to transmit content, advertising, digital coupons using any of the channels transmitted by the RFID tag, then the RFID reader will transmit to the RFID tag advertising, digital coupon(s), and/or other content related to a product or service category specific to a channel.

a ranking level: This means that when an RFID tag is detected by an RFID reader, it will transmit a list of channels. The priority level assigned to a channel indicates to the RFID reader that it should transmit advertising, digital coupon(s) and/or other content to the RFID tag using the channel with the highest priority first. After the channel with the highest ranking is used, then the RFID reader can transmit advertising, digital coupon(s) and/or other content using the channel with the second highest ranking. Then the channel with the third highest ranking will be used and the process will continue until the list of channels received from the RFID tag has been exhausted. If one of the channels in the list is not useable due to overlapping, interference or something else, then the RFID reader will skip it and go to the next highest ranking channel on the list.

a generational category [e.g., Greatest Generation (born prior to 1946), Boomers (1946-1964), Generation X (1965-1976), Millennials (1977-1994)], and/or other consumer profiles and demographic parameters: This means that, when an RFID tag is detected by an RFID reader, it will transmit a list of channels. Each generational category is assigned to a specific channel. This indicates to the RFID reader that it should transmit advertising, digital coupon(s), and/or other content to the RFID tag using the channel specific to a generational category. The list may contain only one channel associated to the generational category of the person who owns the RFID tag.

An RFID tag is able to store in its memory contact information of one or more persons such as:
Cell phone number(s)
Email address(es),
Online social network(s) account information (e.g. personal ID, username, password to Facebook or MySpace)

When an RFID tag is within the read distance of an RFID reader, the RFID tag will transmit mobile phone number(s), email address(es), online social network(s) account information to the RFID reader. An application (e.g., component or subsystem), which is part of the present invention and/or external system, will receive this information from the RFID reader. The application is able to:
Send text message(s) and/or email message(s) to the person(s) containing advertising, digital coupon(s), and other information personalized and targeted. The RFID reader(s) are able to transmit advertising, digital coupon(s), and/or other content to the RFID tag and transmit information associated with mobile phone number(s) and/or email account(s).
Log into the online social network account of a person and insert personalized advertising, digital coupon(s), and/or other content on the person profile page and other pages in his/her account.
Log into the online social network account of a person and send personalized advertising, digital coupon(s), and/or other content into the person's email inbox.
Log into the online social network account of a person and insert personalized advertising, digital coupon(s), and/or other content to members of the person's online social network(s).

When a person carrying an RFID tag enters a building or geographical area where multiple digital signage with RFID readers are installed that detect the RFID tag, the RFID tag is able to receive advertising, digital coupon(s), and/or other content from one or many RFID reader(s) of one or multiple digital signage. If the person is surrounded with many digital signage, he or she is not able to determine which one of the digital signage is about to or currently is displaying personalized and targeted advertising and/or other content. The present invention is able to use the contact information received from the RFID tag or the contact information it has previously stored in order to send step-by-step directions to the person's mobile phone number(s) and/or email address(es) regarding how to travel from the current location of the person to the specific location of the digital signage displaying personalized and targeted advertising and/or other content.

When a person carrying an RFID tag enters a building or geographical area where multiple digital signage with RFID readers are installed that detect the RFID tag, as described above, the RFID tag is programmed to choose the RFID reader from which it will first receive advertising, digital coupon(s), and/or other content from via a specific channel within a frequency band of a wireless protocol. Among the digital coupons available to be transmitted by multiple RFID readers, the RFID tag is programmed to accept the digital coupon or information with the highest monetary value or based on other monetary parameters. The RFID tag is also programmed to transmit the mobile phone number(s) and/or email address(es) it has stored in its memory to only the RFID reader that is able to distribute the digital coupon or information with the highest monetary value. In other words, advertisers, merchants, manufacturers, etc., are able to participate in an electronic auction (on a real-time basis or a non real-time basis) in order to win the right to collect contact information stored in an RFID tag carried by a person. The auction can be based on using different personal information that the bidders would like to collect.

An RFID reader that uses 802.15.4 6LoWPAN or ZigBee wireless protocol is able to communicate with an RFID tag that also operates on 802.15.4 6LoWPAN or ZigBee wireless protocol. RFID readers are able to transmit Uniform Resource Locators (URL), a.k.a. web addresses, to RFID tags. The RFID tags can be part of (or serve as a) payment device at the point of sale. A URL will be received by the 6LowPAN or ZigBee chip of the RFID tag and transmitted to the external memory EEPROM chip; which will pass the URL to the Near Field Communication (NFC) chip on the same RFID tag. The NFC chip will pass the URL to an NFC based contactless payment terminal, which, in turn, passes to an external system. The external system can be a coupon management system which is able to process and validate the URL and provide a response back to the NFC contactless payment terminal. The response can be in the form of a sales coupon that the NFC contactless payment terminal will receive and apply against a payment transaction. The same system and methods can be used for other data elements to be passed from an RFID reader to an RFID tag and subsequently to an external system.

An RFID reader is able to generate a digital coupon or personalized content on a real-time basis and transmit this information to RFID tags. A person carrying an RFID tag is detected by a standalone RFID reader or an RFID reader of a digital signage. An RFID reader is able to use parameters, business rules, and information received from the RFID tag to generate a digital coupon on-the-fly. An RFID reader is able to combine parameters and business rules which have been stored in its memory and other data it has received from an RFID tag to generate the terms and conditions of a digital coupon. The following is an example of how this works:
RFID tag transmits the following data that it has stored: cell phone number, email address, personal preferences, etc.
RFID reader has in its memory or receives the following information from an external database:
RFID reader location (geospatial and geometric coordinates)
channel within the frequency band the RFID reader is using to communicate with the RFID tag
RFID reader IP address
EPC (Electronic Product Code) of the product or service
code uniquely identifying the manufacturer, service provider, vendor, advertiser, etc.
terms and conditions of the digital coupon and/or promotion
RFID reader is able to combine the information received from the RFID tag into series of numbers and generate a unique digital coupon number that it transmit to the RFID tag and the latter will store it in its memory.

With respect to protecting the personal data and, therefore, the privacy of people who are carrying an RFID tag, as set out above, an RFID tag is programmed to store in its memory:
contact information of one or more persons (e.g., cell phone number, email address, online social network account(s) information, etc.). When an RFID tag is within the read distance of an RFID reader, the RFID tag will transmit mobile phone number(s), email address(es), and/or online social network account(s) information to the RFID reader.

personal profile of one or more persons (e.g., consumer profile, personal preferences, age, gender, socio-economic background, address, physiological characteristic, shopping preferences, favorite products, and services, etc.). When an RFID tag is within the read distance of an RFID reader, the RFID tag will transmit the personal profile(s) to the RFID reader.

codes, instructions, variables, and/or data parameters associated with a category of organizations or a specific organization (e.g. advertiser, merchant, seller, media company, first responder agency, building management, building security, etc.)

codes, instructions, variables, and/or data parameters associated with a type of information/content (e.g., sports, weather, politics, advertising, product category, etc.)

The purpose in storing the aforementioned data elements in the RFID tag memory is to assure that a person carrying the RFID tag or an organization supplying the RFID tag is able to store in the memory of the RFID tag and to program the RFID tag to only transmit its unique tag ID and other data elements only if certain conditions are satisfied.

Typically, when an RFID tag is detected by an RFID reader, the RFID tag transmits its unique ID number to the RFID reader which is connected to a database where each tag ID number is associated with a specific person, asset, product, or something else. In other words, there is a one-to-one relationship between the tag ID number and a person. Some privacy concerns have been raised because tracking the movement and the location of an RFID tag means knowing the whereabouts of a person. For example, hospital patients and Alzheimers patients carrying RFID wristbands have their movements tracked throughout the hospital and an alert notification to the hospital staff is triggered if they leave the premises of the hospital or enter some restricted areas of the facility.

In order to avoid matching the location of the RFID tag to the physical movement of the associated person in order to safeguard the privacy of the person, the present invention functions as follows.

An RFID reader will broadcast a signal containing specific code(s) and each code is associated with a type of organization, specific organization name, type of information/content or something else using a channel(s) of one or more wireless protocols.

An RFID tag that enters the read range/perimeter of an RFID reader will receive the code(s) and compare them to the list of code(s) it has already stored in its memory. The purpose of this comparison is to make sure that the RFID tag only transmits information that is uniquely identifying the owner of the RFID tag to an RFID reader only under certain conditions.

An RFID tag can be programmed to transmit or not transmit information uniquely identifying a person to an RFID reader based on the following conditions:

Each code(s) stored in the memory of the RFID tag also has a transmit variable that can be turned to ON or OFF (e.g., YES or NO). If there a match between the code received from the reader and the code stored in the tag and the transmit variable is set to YES, then the RFID tag is enabled to transmit information uniquely identifying a person to an RFID reader using one or more channels associated with the type of information and/or organization.

If there is a match and the transmit variable is set to NO, then the RFID tag is not programmed to transmit information uniquely identifying a person to an RFID reader.

If there are no matches between the code(s) received from the RFID reader and the code(s) stored in the RFID tag, then the RFID tag will not transmit any information uniquely identifying a person and its unique tag ID, but it can transmit other types of generic information that do not uniquely identify a person.

If there are no matches between the code(s) received from the RFID reader and the code(s) stored in the RFID tag, then the RFID tag will not transmit anything to the RFID reader, and, therefore, the RFID reader is not aware of the presence of this specific RFID tag within its read range/distance. An RFID tag is able to receive a signal from one or many RFID readers while those RFID readers are not able to detect the presence of the RFID tag.

Certain code(s) transmitted by an RFID reader and received by an RFID tag will force an override of the comparison logic and transmit variable in the tag. For example, if there is an emergency incident, such as a fire, earthquake, or explosion, an RFID reader can be programmed to broadcast a code specific to "Emergency Evacuation" or a code specific to "Emergency Alarm". The code(s) could be equivalent to 911. Therefore, if an RFID tag receives 911 as a code from an RFID reader, then the RFID tag will automatically transmit information uniquely identifying a person using any of the channels or a dedicated "Emergency" channel of the same wireless protocol. The need to expedite the search and rescue process by electronically accounting for everyone with an RFID tag should have priority over the privacy concerns. In this case, the RFID reader can be triggered to transmit the 911 code when a fire alarm system or another type of emergency alarm system goes OFF. An RFID reader can be connected over wires or a wireless connection to an alarm system which sends a signal to the RFID reader when it is goes OFF. Alternatively an RFID reader can be triggered to transmit an emergency code (e.g., 911) by the sound of an emergency alarm by commands received from an external system which is part of the present invention or commands received from a third party external system and/or hardware.

If there are one or more matches and if the RFID tag is programmed to transmit information uniquely identifying the owner of the RFID tag; then the RFID tag will transmit its unique tag ID and other unique personal information to the RFID reader. Otherwise, if the codes received from the RFID reader do not match the code(s) stored in the RFID tag memory, then the RFID tag will not transmit its unique tag ID and other unique personal information, but it can transmit other types of generic information that is not uniquely identified with a person.

In certain situations, the RFID tag will transmit information uniquely identifying a person if specific codes are received.

The privacy protection system and method of the present invention can be combined with the system and method of the real-time bidding of channels of the same wireless protocol. A person located in a physical/geographical area carrying an RFID tag which is operating standalone or is embedded within or attached to a wireless device (e.g., cellular phone, Wi-Fi personal device, personal computer, laptop, and the like) is detected by RFID readers based on the privacy protection system and method.

The RFID reader transmits using one, many or all of the channels within the same wireless protocol and the transmission can be done simultaneously across all the channels or periodically or sequentially by channel or randomly by channel. Each channel can be assigned to one organization or a group of organizations as previously described.

In a situation where merchants, advertisers, or other organizations are targeting people with personalized or non-personalized information, the RFID tag of a person receives a wireless signal containing the unique code(s) associated with organizations that is evaluated if the codes received match with the codes stored in its memory. Also evaluated is which code (e.g., organization) is offering the highest reward, benefit, discount and/or payoff based on the information included in the wireless signal coming from the RFID reader. The RFID tag only transmits/responds to the RFID reader if there is a match with the code(s) associated with an organization or group of organization(s) that won the real-time or non-real time bidding. Therefore, by receiving an acknowledgement signal response, the RFID reader is able to trigger the wireless transmission of personalized and/or non-personalized information to the wireless device of the person and/or display personalized information on a digital signage for the person.

The RFID tag can respond to the RFID reader using the channel associated with the organization or group of organizations that won the bidding. This enables the RFID reader to determine, based on the channel used by the RFID tag to transmit, which organization(s) has won the bidding and the type of information that is needed to be transmitted and/or displayed.

The RFID tag can also be programmed to transmit a list of channels belonging to the same wireless protocol or multiple wireless protocols. If the RFID reader is programmed to transmit content, advertising, or digital coupons using any of the channels transmitted by the RFID tag, then the RFID reader will transmit to the RFID tag advertising, digital coupons, and/or other content related to a product or service category specific to a channel.

A person carrying an RFID tag within the read range of an RFID reader and also carrying a mobile device is able to send commands via text messages to a system that is connected to the RFID reader. The RFID reader will then transmit those commands to the RFID tag associated with the person and the mobile device. The RFID tag can be embedded in the mobile device as well.

The person is able to send commands via text message Short Message Service (SMS) messages or a Graphic User Interface (GUI) (e.g., WAP Interface, Web Brower) to a system that is connected to the RFID reader. The RFID reader will then transmit those commands to the RFID tag associated with the person and the mobile device. The person can send commands to change the privacy settings on the RFID tag. The person can send commands to modify, delete, write, or change information in the RFID tag. If the RFID tag is embedded in the mobile device, the person is able to use the keypad of the phone or the touch screen of the phone to enter information and send commands to modify, delete, write, or change any type of information stored in the memory of the RFID tag. The information stored and the commands sent to the RFID tag can then be transmitted by the RFID tag to the RFID reader of the digital signage. The codes associated with a type of organization, specific organization name, type of information/content, or something else can be stored from the keypad, touch screen, or camera of the phone. These codes can be barcode or QR code of products and services including the respective manufacturers. Therefore, an RFID tag can receive the barcodes and QR codes transmitted by an RFID reader and compare them against the barcodes and QR codes stored in its memory.

The RFID reader has cognitive radio capabilities which allow it to detect the presence of devices (e.g., mobile phones, PDA, RFID tags) that operate on multiple and different wireless protocols within its read range. The RFID reader is able to open a wireless connection and communicate two-way with a Wi-Fi enabled mobile device, so that the person is able to send commands to his or her RFID tag through the RFID reader.

An RFID reader can be powered by connecting it to an alternating current power outlet or by direct current batteries, thermocouples, solar cells, and commutator-type electric machines of the dynamo type. An RFID reader that is fully powered by internal batteries will stop operating when the batteries run out. An RFID reader that is powered both by internal batteries and alternating current can be regulated in such a way as to conserve battery life based on the following:

An RFID reader can operate in battery mode when there is no communication with RFID tags An RFID reader can be automatically switched to operate on alternating current when the number of RFID tags it communicates with exceeds or is equal to a predetermined number.

An RFID reader can be automatically switched to operate on battery mode when the number of RFID tags it communicates with is below or is equal to a predetermined umber.

An RFID reader can be automatically switched to operate on alternating current when the amount of data it is receiving and/or sending exceeds or is equal to a predetermined amount of data.

An RFID reader can be automatically switched to operate on battery mode when the amount of data it is receiving and/or sending is below or is equal to a predetermined number.

The RFID tag that uses 802.15.4 6LoWPAN wireless protocol is capable of communicating with an RFID reader that also operates on 802.15.4 6LoWPAN. The following is a description of the RFID reader block diagram of FIG. 4.

Figure 4:
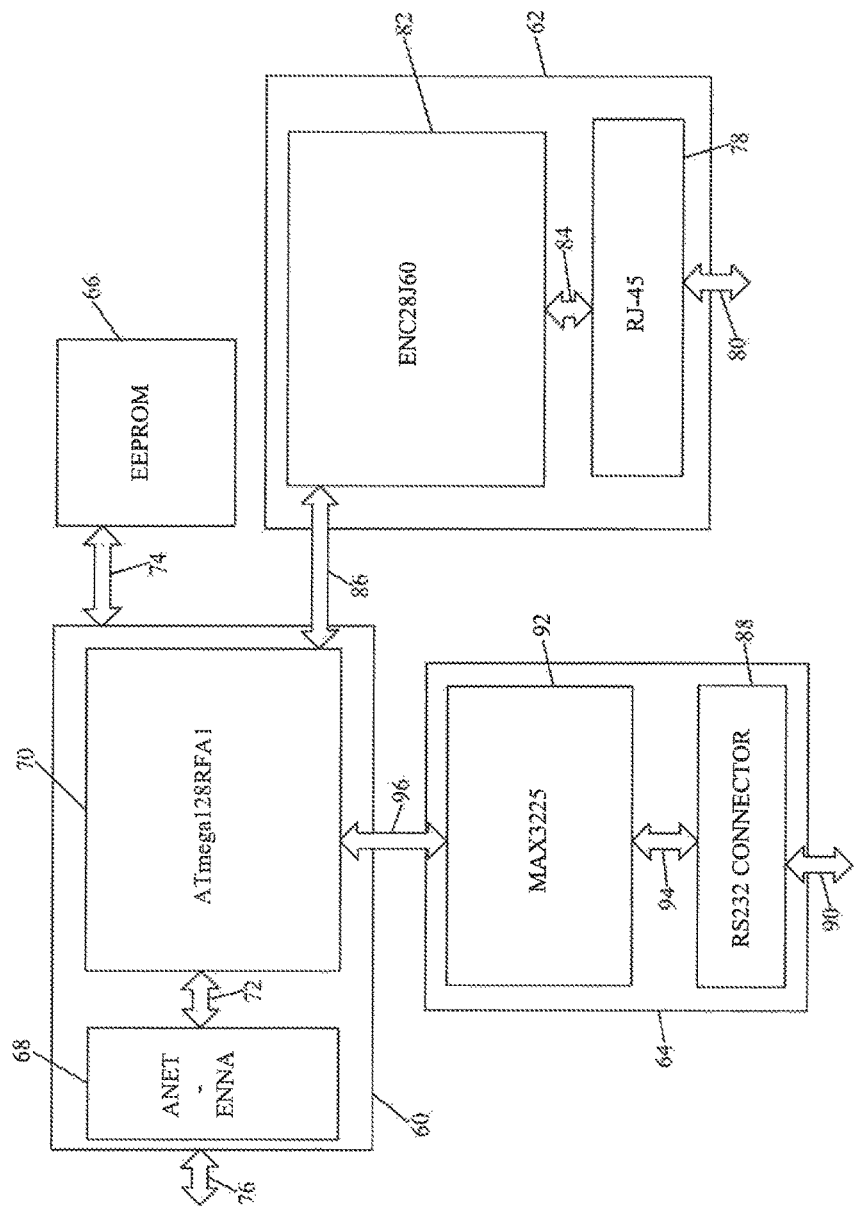
FIG. 4 is a block diagram of a preferred embodiment of the RFID reader of the present invention.

The RFID reader illustrated in FIG. 4 can be divided into four functional blocks:

6LoWPAN module 60

Ethernet module 62

RS232 module 64

EEPROM 66

The FIG. 4 RFID reader receives data from an RFID tag or another RFID reader through an antenna 68 and sends this data to the ATmega128RFA1, identified by reference numeral 70 (i.e., the 6LoWPan chip), via interface 72 where this data is processed and the processed data is conducted to EEPROM 66 for storage via interface 74 using the SPI. Data can also be read from EEPROM 66 via interface 74, and sent to ATmega128RFA1 70 using the same SPI. This data, in 6LowPAN format, is conducted to antenna 68 via interface 72 for transmission to the destination RFID tag or RFID reader via interface 76 at a 2.4 GHz frequency.

If the FIG. 4 RFID reader communicates with an external host through the Ethernet, then data from the host is received at RJ-45 socket 78 via interface 80. RJ-45 socket 78 transmits this data to the Ethernet controller chip 82 (i.e., ENC28J60) via interface 84. The Ethernet controller chip 82 removes the MAC header and converts this into a format that is compatible with the 6LoWPAN chip 70. The formatted data is transmitted to the 6LoWPAN chip 70 via interface 86 using SPI. 6LoWPAN chip 70 transmits data using the Ethernet by sending this data to Ethernet controller chip 82 via interface 86 using SPI which converts this data into IEEE802.3 format and transmits this converted data to RJ-45 socket 78 via interface 84. Data is sent to the destination host via interface 80 which is a CAT5 cable connected to the RJ-45 socket.

When the FIG. 4 RFID reader communicates with an external host (e.g. computer server running a database) via an RS232 connector 88, the data flows via interface 90 to the connector pin and then to MAX3225, identified by reference numeral 92, via interface 94. MAX3225 converts the data format, so that it is compatible with 6LoWpan chip 70. This properly formatted data is transmitted to 6LoWPAN chip 70 via interface 96 using UART0. Similarly, data is transmitted from 6LoWPAN chip 70 via interface 96 using UART0. MAX3225 converts data from 6LoWPAN chip 70 into a format that is compatible with RS232 connector 88 and transmits this properly formatted data to the connector pins of the RS232 connector via interface 94.

The FIG. 4 RFID reader is enabled to connect with the host via the Ethernet by ENC28J60 chip 82 of Ethernet module 62. The ENC28J60 chip 82 converts the data in IEEE802.15 format in 6LoWPAN chip 70 to IEEE802.3 Ethernet format. The ENC28J60 chip 82 is connected to the 6LoWPAN chip via interface 86 and the data is transmitted to the ENC28J60 chip 82 where it is converted into Ethernet frame format. Also, data received by the ENC28J60 chip 82 from the host is first converted to 6LoWPAN format by the ENC28J60 chip and then transmitted to 6LoWPAN 70 chip.

Figure 5:
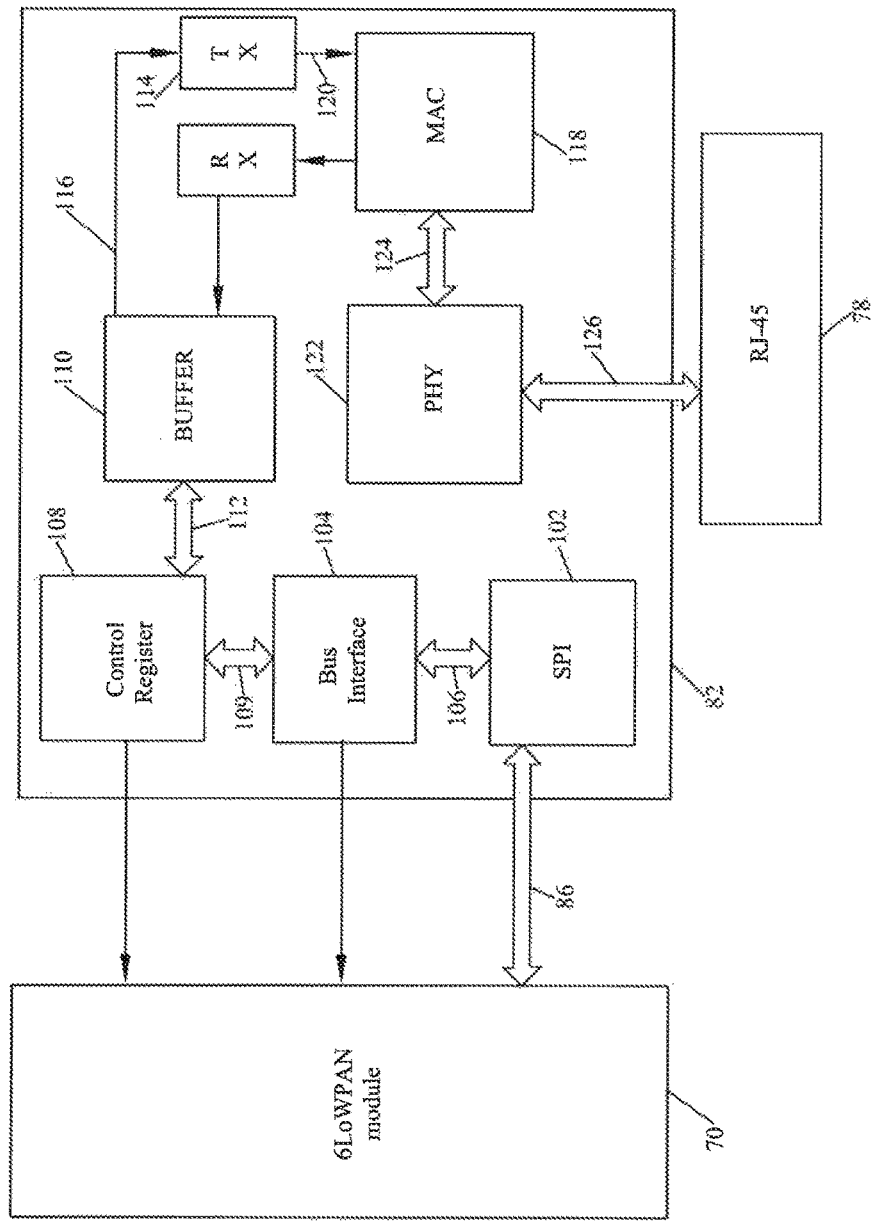
FIG. 5 is a block diagram of the components of the FIG. 4 RFID reader that connect the FIG. 4 RFID reader to a wireless network or to a wired network or to the Internet.

Referring to FIG. 5, interface 86 serves to exchange data between 6LoWPAN chip 70 and the Ethernet controller ENC28J60 chip 82. The chip is selected, SPI clock 102 is set, and data is transmitted to ENC28J60 chip 82. Data is placed on a bus interface 104 via interface 106 and transmitted to a control register 108 via interface 109. The control register 108 places the data on a buffer 110 via interface 112 where the data waits for TX block 114 to access it. TX block 114 selects the data via interface 116 and this data is transmitted to MAC block 118 via interface 120. MAC block 118 appends a MAC header (i.e., deliminator, CRC, padding, etc.) to the data according to IEEE802.3. After adding the MAC header, the packet is forwarded to PHY block 122 via interface 124 where the packet is modulated according to the IEEE802.3 standard and other physical layer features of the packet are enabled. The packet is then transmitted to the RJ-45 socket 78 via interface 126 and the data is sent to the Ethernet port via a CAT cable that is connected to the RJ-45 socket.

System and Method for Enabling a Mobile Device to Operate in RFID Communication Mode Existing mobile devices such as Portable Digital Assistants (PDA), Tablets, Smartphones (e.g. iPhone, Android operating system based smartphone, Windows Mobile operating system based smartphone, Blackberry etc.) include wireless communication chips and Radio Frequency (RF) chips. These wireless chips are based on various standard wireless protocols and proprietary wireless protocols such as Wi-Fi (802.11 family), ZigBee, Bluetooth etc. These wireless chips enable the mobile device to communicate with other mobile devices, network access points and other communication equipment in order transmit and receive data, video, audio information.

The present invention enables the mobile device to switch from its manufacturer/factory normal mode of operation and be able to operate in RFID mode and, therefore, transmit and receive information to/from an RFID Reader or wireless network access point (e.g. Wi-Fi access point) operating under the same wireless protocol. For example, a user, carrying a iPhone smartphone with Wi-Fi capability, is able to access the user interface/screen where the iPhone settings are managed and change the iPhone from Wi-Fi communication mode to RFID communication mode or operate in dual Wi-Fi+RFID communication mode. Using the iPhone settings screen, the user is also to disable the RFID communication mode and switch back to normal communication mode (e.g. Wi-Fi communication mode or Bluetooth communication mode or ZigBee communication mode).

Alternatively the mobile device can automatically operate in RFID communication mode or dual Wi-Fi+RFID communication mode when it detects a signal transmitted by an RFID reader using the wireless protocols as one of the wireless chips inside the mobile device. The mobile device can automatically disable its RFID communication mode and switch back to normal communication mode (e.g. Wi-Fi communication mode or Bluetooth communication mode or ZigBee communication mode).

The out of the box settings screen of a mobile device, such as an iPhone, Android phone or Windows phone, allow a user to manage the operations of the device, such as the adjusting the sound volume, selecting ringtones, turning off/on the airplane mode, turning off/on the Wi-Fi communication mode, turning off/on the Bluetooth communication mode, turning off/on the GPS location service, turning off/on the cellular communication mode etc.

The present invention provides an additional setting for enabling the Wi-Fi chip inside the mobile device or any other wireless chip inside to switch to RFID communication mode. The additional setting can be installed by modifying the operating system of the mobile device or installation of an application developed separately as part of the invention. Some mobile devices, such as an Android operating system based mobile device, have an Open Source operating system that provide a programmer access to the source code and modify, without restrictions or with very little restrictions, the operating system. The programmer can then write a program to enable this capability.

The following is an example of how this capability can be implemented in a smartphone that includes a Wi-Fi chip. However, the present invention can be implemented using mobile devices with other types of wireless chips.

Assign an RFID tag number (note: the terms "RFID Tag number" and "RFID Tag ID" are interchangeable). Each RFID tag has a unique alphanumeric key identifier that it transmits to the RFID Reader. A wireless chipset, within a mobile device sold by a wireless carrier or an original equipment manufacturer (OEM), does not have an RFID tag number. Therefore, in order to assign an RFID tag number, the user is provided a field on the user interface screen where to type-in the tag number and save to the mobile device memory chip of the device or directly into the wireless chip internal memory. Some wireless chips such as the ATmega128RFA1, which are systems on chip (SOC), include subcomponents, such as an internal memory (e.g.

EEPROM), a microcontroller and a radio transceiver. If the wireless chip (e.g. Samsung SWB-B42 BT 4.0 or Broadcom BCM4330) inside the smartphone does not have an internal memory, then the memory of the smartphone (e.g. Samsung KMVYL000LM or Toshiba THGVX1G7D2GLA08) itself can be used to store the RFID tag number, and then the smartphone memory can allow the wireless chip to retrieve the RFID tag number as needed to communicate with the RFID reader or with a wireless network access point with RFID capability (e.g. such as Wi-Fi based RFID solutions from vendors, such as Cisco Systems, Ekahau, Aeroscout). Alternatively the MAC Address or IP Address of the smartphone can be used as the RFID tag number instead of entering an arbitrary tag number from the device user interface/screen. The present invention provides the user with the ability to choose between entering an arbitrary tag number, the device MAC Address or the IP Address to serve as the RFID tag number.

Figure 6:
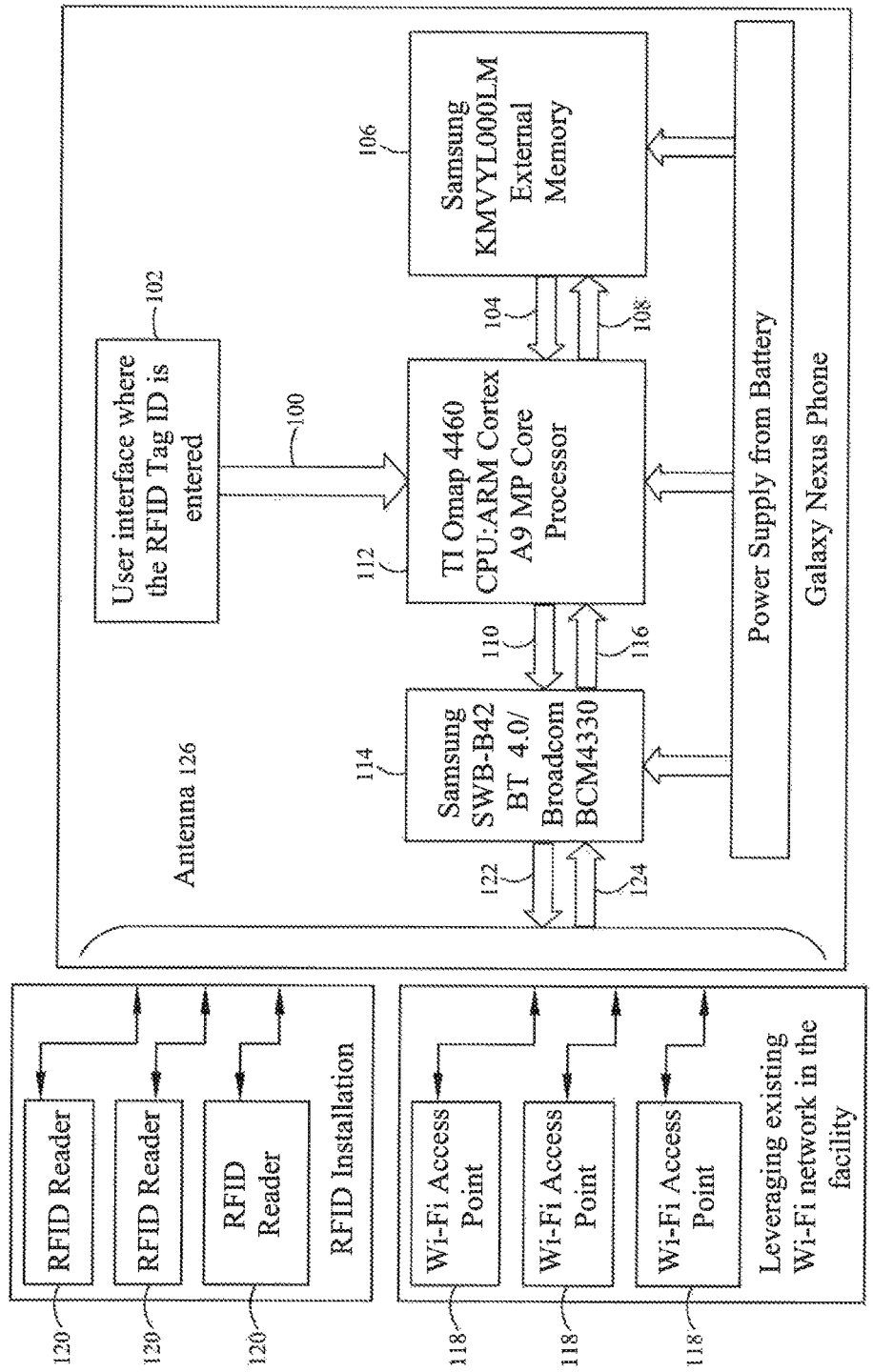
FIG. 6 is block diagram of a second preferred embodiment of the present invention.

Reference is made to FIG. 6, which is a block diagram of a smartphone (the Galaxy Nexus Phone) running the Android operating system, which is programmatically converted to operate in RFID communication mode. This block diagram serves as an example using the Galaxy Nexus phone. Other mobile devices, such as the iPhone 4S, iPad or the Samsung Focus Windows 7 phone or similar mobile devices have different block diagrams but the approach is similar.

- Arrow 100: The RFID tag ID is entered via the smartphone user interface 102, as well as other data, such as first name, last name, and other personal information and demographic information
- Arrow 104: Data is retrieved from the external memory 106. This includes the RFID tag ID as well as other data, such as first name, last name, and other personal information and demographic information
- Arrow 108: Data stored into the external memory 106. This includes the RFID tag ID as well as other data.
- Arrow 110: The data is sent from the processor 112 to the Wi-Fi chip 114 for transmission. In the RFID communication mode, this includes all the details about the RFID tag and the commands for sending out beacons.
- Arrow 116: The data received from the Wi-Fi chip 114 is sent to the processor 112. In the RFID communication mode, this includes all the communication received from the wireless Wi-Fi Access Point 118 or the RFID Reader 120.
- Arrow 122: The signal emitted by Wi-Fi chip 114 is set for transmission. In the RFID communication mode, one possible method is to use a beaconing technique where a beacon is emitted continuously at regular intervals until an RFID compatible wireless Wi-Fi Access Point 118 or RFID Reader 120 has been detected. After a wireless Wi-Fi Access Point 118 or RFID Reader 120 is detected, the RFID tag ID is transmitted in the data packet which is sent to the wireless Wi-Fi Access Point 118 or RFID Reader 120.
- Arrow 124: The wireless signal is received by Wi-Fi chip 114 from the Antenna 126.

The smartphone, with a Wi-Fi chipset 114, can be switched to RFID communication mode in order to communicate either with an RFID Reader 120 or Wi-Fi Access Point 118 using a compatible wireless chipset. As previously explained, RFID Reader 120 or Wi-Fi Access Point 118 can be connected or embedded inside a digital signage and/or connected directly to a database which provides the ability to display and or transmit personalized information and personalized advertising content for the user carrying the mobile device.

The wireless Wi-Fi Access Point (WAP) 118 is configured to recognize the incoming data packets sent by the mobile devices operating as RFID tags and responds with a predetermined data packet, so that data can be exchanged with the mobile device. This can be achieved by having the firmware built inside the reader itself to respond to the packets received from the mobile devices operating as RFID tags. This would require additional hardware or software or both on the WAP 118 device that may be integrated inside the main unit of WAP device.

The system and method for enabling a mobile device to operate in RFID communication mode is supplemental to the previously features considered above. Instead of using an RFID tag embedded in a personal ID card or other RFID tags with different form factors, this aspect of the present invention describes the ability to programmatically convert mobile devices, such as smartphones or tablets available for purchase in the market, to operate as RFID tags without adding or removing physical components to the device. The list of features in the table below can also be implemented using smartphones operating in RFID communication mode.

It is important to note that features of the present invention, listed in the table below and described in herein, can be implemented without using RFID technology by relying on the Media Access Control address (MAC address) of the mobile device or the Internet Protocol address (IP address) of the mobile device or other unique identifiers of the mobile device in order to enable the bi-directional communication with a digital signage, wireless network access point, or another communication device. These aforementioned devices and equipment are able to transmit and receive bi-directionally using a compatible wireless protocol and wireless chips.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method for bi-directionally exchanging information relating to the marketing of products and services, said method comprising the steps of:
    storing in a database associated with a radio-frequency identification (RFID) reader:
    (a) product/service information relating to the marketing of products and services that are of potential interest to a group of subscribers to the product/service information, and
    (b) coded information relating to:
        (1) the identities of subscribers to the stored product/service information, and
        (2) personal profiles of individual subscribers to the stored product/service information that indicate which products and services are of potential interest to individual subscribers;
    transmitting a presence signal from a RFID tag in the possession of a selected subscriber that includes coded identity information uniquely associated with the selected subscriber indicating his/her presence in a physical area within the signal receiving range of a digital signage RFID reader;
    receiving the presence signal by the RFID reader;

confirming the status of the selected subscriber as being a subscriber to the product/service information by comparing the coded identity information uniquely associated with the selected subscriber in the presence signal with the stored coded information relating to the identity of the selected subscriber;

retrieving stored personal profile information of the selected subscriber and the stored product/service information;

selecting from the stored product/service information the product/service information of potential interest to the selected subscriber based on the stored profile information of the selected subscriber;

displaying on a screen of the digital signage for viewing by the selected subscriber the selected product/service information;

transmitting an inquiry signal from the RFID reader relating to the selected product/service information;

receiving by the RFID tag in the possession of the selected subscriber the inquiry signal;

transmitting by the selected subscriber an interest signal indicating at least one of:
(a) no interest in the selected product/service information, and
(b) interest in the selected product/service information;

receiving by the RFID reader the interest signal; and analyzing the interest signal and determining at least one of:
(1) ending communications between the RFID reader and the RFID tag when the interest signal indicates no interest in the selected product/service information, and
(2) continuing communications between the RFID reader and the RFID tag when the interest signal indicates interest in the selected product/service information.

2. A method according to claim 1 wherein the step of the selected subscriber transmitting an interest signal includes the selected subscriber moving in a first direction relative to the RFID reader for a no interest response and in a second direction relative to the RFID reader for an interest response.

3. A method for bi-directionally exchanging information relating to the marketing of products and services, said method comprising the steps of:

storing in a database associated with a radio-frequency identification (RFID) reader:
(a) product/service information relating to the marketing of products and services that are of potential interest to a group of subscribers to the product/service information, and
(b) coded information relating to:
(1) the identities of subscribers to the stored product/service information, and
(2) personal profiles of individual subscribers to the stored product/service information that indicate which products and services are of potential interest to individual subscribers;

transmitting a presence signal from an RFID tag in a wireless communications device in the possession of a selected subscriber that includes coded identity information uniquely associated with the selected subscriber indicating his/her presence in a physical area within the signal receiving range of a digital signage RFID reader;

receiving the presence signal by the RFID reader;

confirming the status of the selected subscriber as being a subscriber to the product/service information by comparing the coded identity information uniquely associated with the selected subscriber in the presence signal with the stored coded information relating to the identity of the selected subscriber;

retrieving stored personal profile information of the selected subscriber and the stored product/service information;

selecting from the stored product/service information the product/service information of potential interest to the selected subscriber based on the stored profile information of the selected subscriber;

displaying on a screen of the digital signage for viewing by the selected subscriber the selected product/service information;

transmitting an inquiry signal from the RFID reader relating to the selected product/service information;

receiving by the RFID tag in the wireless communications device in the possession of the selected subscriber the inquiry signal;

transmitting by the selected subscriber an interest signal indicating at least one of:
(a) no interest in the selected product/service information, and
(b) interest in the selected product/service information;

receiving by the RFID reader the interest signal; and analyzing the interest signal and determining at least one of:
(1) ending communications between the RFID reader and the RFID tag when the interest signal indicates no interest in the selected product/service information, and
(2) continuing communications between the RFID reader and the RFID tag when the interest signal indicates interest in the selected product/service information.

4. A method according to claim 3 wherein the step of the selected subscriber transmitting an interest signal includes the selected subscriber moving in a first direction relative to the RFID reader for a no interest response and in a second direction relative to the RFID reader for an interest response.

5. A method for bi-directionally exchanging information relating to the marketing of products and services, said method comprising the steps of:

storing in a database associated with a radio-frequency identification (RFID) reader product/service information relating to the marketing of products and services that are of potential interest to a person in possession of an RFID;

transmitting a presence signal from the RFID tag that:
(a) indicates the presence of the person in possession of the RFID tag in a physical area within the signal receiving range of the RFID reader, and
(b) includes:
(1) information relating to products and services of potential interest to the person in possession of the RFID tag, and
(2) coded identity information uniquely associated with the person in possession of the RFID tag;

receiving the presence signal by the RFID reader;

comparing the product/service information stored in the database associated with the RFID reader with the information relating to products and services of potential interest to the person in possession of the RFID tag;

selecting from the product/service information stored in the database associated with the RFID reader the product/service information of potential interest to the person in possession of the RFID tag based on the comparison the product/service information stored in the database associated with the RFID reader with the information relating to products and services of potential interest to the person in possession of the RFID tag;

displaying for viewing by the person in possession of the RFID tag the selected product/service information;

transmitting an inquiry signal from the RFID reader relating to the selected product/service information;

receiving by the RFID tag the inquiry signal;

transmitting by the RFID tag an interest signal indicating at least one of:

(a) no interest in the selected product/service information, and (b) interest in the selected product/service information;

receiving by the RFID reader the interest signal; and analyzing by the RFID reader the interest signal and determining at least one of:

(1) ending communications between the RFID reader and the RFID tag when the interest signal indicates no interest in the selected product/service information, and (2) continuing communications between the RFID reader and the RFID tag when the interest signal indicates interest in the selected product/service information.

6. A method according to claim 5 further including the step of storing the coded identity information uniquely associated with the selected subscriber in a database associated with the RFID reader.

* * * * *